United States Patent
Machida et al.

(12)

(10) Patent No.: US 6,169,154 B1
(45) Date of Patent: Jan. 2, 2001

(54) BRANCHED ETHYLENIC MACROMONOMER AND ITS POLYMER

(75) Inventors: Shuji Machida; Masahiro Mitani; Masami Watanabe; Nobuhiro Yabunouchi, all of Sodegaura (JP)

(73) Assignee: Idemitsu Kosan Co., Ltd., Tokyo (JP)

( * ) Notice: Under 35 U.S.C. 154(b), the term of this patent shall be extended for 0 days.

(21) Appl. No.: 09/344,806

(22) Filed: Jun. 25, 1999

Related U.S. Application Data

(62) Division of application No. 08/632,475, filed as application No. PCT/JP94/01792 on Oct. 26, 1994, now Pat. No. 5,955,557.

(30) Foreign Application Priority Data

Oct. 26, 1993 (JP) .................................................... 5-266803

(51) Int. Cl.[7] .................................................... C08F 110/02
(52) U.S. Cl. ........................ 526/352; 526/346; 526/348; 585/10; 585/12
(58) Field of Search .................................... 526/352, 346, 526/348; 585/10, 12

(56) References Cited

U.S. PATENT DOCUMENTS

| | | |
|---|---|---|
| 5,023,388 | 6/1991 | Lüker . |
| 5,055,438 | 10/1991 | Canich . |
| 5,096,867 | 3/1992 | Canich . |
| 5,104,952 | 4/1992 | Babu . |
| 5,272,236 | 12/1993 | Lai et al. . |
| 5,278,272 | 1/1994 | Lai et al. . |
| 5,444,145 | 8/1995 | Brant et al. . |

FOREIGN PATENT DOCUMENTS

| | | |
|---|---|---|
| 15 20 925 | 4/1970 | (DE) . |
| 0 321 851 | 6/1989 | (EP) . |
| 0 495 099 | 7/1992 | (EP) . |
| WO 93/08221 | 4/1993 | (WO) . |
| WO 94/07930 * | 4/1994 | (WO) . |

OTHER PUBLICATIONS

Story et al. "The New Family of Polyolefins from Insite Technology" MetCon '93.
Knight et al. "Constrained Geometry Catalyst Technology: New Rules for Ethylene alpha–olefin Interplymres, Unique Structure and Property Relationships", RETEC '93.

\* cited by examiner

*Primary Examiner*—David W. Wu
*Assistant Examiner*—Caixia Lu-Rutt
(74) *Attorney, Agent, or Firm*—Oblon, Spivak, McClelland, Maier & Neustadt, P.C.

(57) ABSTRACT

There are herein disclosed a branched ethylenic macromonomer which can function as a comonomer to provide a copolymer having excellent molding and working properties and which can be hydrogenated to provide a hydrogenated product as a wax useful in various uses, a copolymer having the excellent molding and working properties obtainable by using this macromonomer as a comonomer, and a branched ethylenic polymer having a low-molecular weight obtainable by hydrogenating the macromonomer. The branched ethylenic macromonomer of the present invention is derivable from ethylene singly or derivable from ethylene and another olefin, (a) a molar ratio of a terminal methyl group/a vinyl group in the macromonomer being in the range of 1 to 100, the macromonomer having a branch other than the branch directly derived from the other olefin, (b) a ratio of vinyl groups to the total unsaturated groups in the macromonomer being 70 mol % or more, (c) a weight-average molecular weight of the macromonomer in terms of a polyethylene measured by a GPC being in the range of 100 to 20,000.

9 Claims, No Drawings

BRANCHED ETHYLENIC MACROMONOMER AND ITS POLYMER

This application is a division of application Ser. No. 08/632,475 filed on Apr. 26, 1996, now U.S. Pat. No. 5,955,554 which was filed as an International Application PCT/JP94/01792 on Oct. 26, 1994.

DESCRIPTION

1. Technical Field

The present invention relates to a novel branched ethylenic macromonomer, its polymer, and a branched ethylenic polymer obtainable by hydrogenating the macromonomer. More specifically, the present invention relates to a branched ethylenic macromonomer which can function as a comonomer to provide a copolymer having excellent molding and working properties and which can be hydrogenated to provide a hydrogenated product as a wax useful in various uses, a copolymer having the excellent molding and working properties obtainable by using this macromonomer as a comonomer, and a branched ethylenic polymer (a wax) having a low-molecular weight obtainable by hydrogenating the macromonomer.

2. Background Art

Heretofore, with regard to a polyethylene or an ethylene-α-olefin copolymer, its primary structure has been controlled by adjusting molecular weight, a molecular weight distribution or copolymerization properties (random properties, a blocking tendency and a branching degree distribution), or by adding a third component such as a diene to the polymer so as to introduce branches thereto.

On the other hand, for ethylenic polymers, various molding methods are usable, and typical known examples of the molding methods include injection molding, extrusion, blow molding, inflation, compression molding and vacuum forming. In such molding methods, the impartment of high-speed molding properties and the reduction of molding energy have been investigated for a long period of time in order to improve working properties and to thus lower a working cost, and so it is an important theme that optimum physical properties suitable for each use is imparted and the molding can be carried out with the optimum working properties.

In recent years, it has been elucidated that a uniform metallocene catalyst is excellent in the copolymerization properties between olefins, can obtain a polymer is having a narrow molecular weight distribution, and has a much higher catalytic activity as compared with a conventional vanadium catalyst. Therefore, it has been expected that the metallocene catalyst will be developed in various technical fields by the utilization of such characteristics. However, a polyolefin obtained by the use of the metallocene catalyst is poor in molding and working properties, and for this reason, the application of the metallocene catalyst to the blow molding and the inflation is unavoidably limited.

In order to solve such a problem, various olefinic polymers have been disclosed into which the long-chain branches are introduced. For example, there have been disclosed (1) an olefin copolymer having the long-chain branches obtained by the use of an α,ω-diene or a cyclic endomethylenic diene (Japanese Patent Application Laid-open No. 34981/1972), (2) a process for preparing a copolymer containing a higher non-conjugated diene content in a high-molecular weight segment than in a low-molecular weight segment which comprises carrying out polymerization in two steps to copolymerize the non-conjugated diene with an olefin (Japanese Patent Application Laid-open No. 56412/1984), (3) an ethylene-α-olefin-1,5-hexadiene copolymer obtained by the use of a metallocene/aluminoxane catalyst (Japanese Patent Application PCT-through Laid-open No. 501555/1989), (4) a process for introducing the long-chain branches by copolymerizing an α,ω-diene and ethylene in the presence of a catalyst comprising a zero-valent or a divalent nickel compound and a specific aminobis(imino) compound (Japanese Patent Application Laid-open No. 261809/1990), and (5) a polyethylene containing both of the short-chain branches and the long-chain branches which can be obtained by polymerizing ethylene alone by the use of the same catalytic component as in the above-mentioned (4) (Japanese Patent Application Laid-open No. 277610/1991).

However, in the copolymer of the above-mentioned (1), a crosslinking reaction takes place simultaneously with the formation of the long-chain branches by the diene component, and at the time of the formation of a film, a gel is generated. In addition, melt properties inversely deteriorate, and a control range is extremely narrow. Moreover, there is a problem that copolymerization reactivity is low, so that low-molecular weight polymers are produced, which leads to the deterioration of physical properties inconveniently. In the preparation process of the copolymer described in the aforesaid (2), the long-chain branches are introduced into the high-molecular weight component, so that the molecular weight noticeably increases due to crosslinking, and thus insolubilization, nonfusion or gelation might inconveniently occur. Furthermore, the control range is narrow, and the copolymerization reactivity is also low, and hence, there is a problem that owing to the production of the low-molecular weight polymers, the physical properties deteriorate inconveniently. In the copolymer of the above-mentioned (3), a molecular weight distribution is narrow, and for this reason, the copolymer is unsuitable for extrusion, blow molding and film formation. In addition, since branch points are formed by the progress of the cyclizing reaction of 1,5-hexadiene, an effective monomer concentration is inconveniently low. In the process for introducing the long-chain branches described in the above-mentioned (4), there is a problem that a range for controlling the generation of a gel and the physical properties is limited. In addition, the polyethylene of the above-mentioned (5) is a polymer which contains neither ethyl branches nor butyl branches and therefore the control of the physical properties, for example, the control of density is accomplished by methyl branches, so that the physical properties of the polyethylene tend to deteriorate.

Furthermore, there has been disclosed a method for preparing an ethylenic polymer to which working properties are imparted by the utilization of copolymerization, for example, a method which comprises forming a polymer ([η]=10–20 dl/g) by preliminary polymerization, and then preparing an ethylene-α-olefin copolymer by main polymerization (Japanese Patent Application Laid-open No. 55410/1992). This method has an effect that melt tension can be increased by changing the melt properties of the obtained copolymer, but it has a drawback that a film gel tends to occur.

In addition, there have been disclosed ethylenic polymers obtained in the presence of a metallocene catalyst and methods for preparing the same, for example, (1) a method for preparing an ethylenic polymer in the presence of a constrained geometrical catalyst and an ethylenic copolymer obtained by this method (Japanese Patent Application Laid-open No. 163088/1991 and WO93/08221), (2) a method for preparing a polyolefin in the presence of a metallocene catalyst containing a porous inorganic oxide (an aluminum compound) as a carrier (Japanese Patent Application Laid-open No. 100808/1992), and (3) an ethylene-α-olefin copolymer which can be derived from ethylene and the α-olefin in the presence of a specific hafnium catalyst and which has a narrow molecular weight distribution and improved melt flow properties (Japanese Patent Application Laid-open No. 276807/1990).

However, in the technique of the above-mentioned (1), the obtained ethylenic copolymer has a narrow molecular weight distribution and a narrow branching degree distribution, and both of these disadvantages cannot separately be controlled. Furthermore, there is a description that in this ethylenic copolymer, long-chain branches are present and so the ethylenic copolymer is excellent in working properties, i.e., melt flow properties, but these properties are still poor. In addition, there is no concrete description regarding other important working properties, above all, molding stabilities (a swell ratio, melt tension and the like).

According to the preparation method of the above-mentioned (2), the obtained copolymer of ethylene and the α-olefin has a large die swell ratio, but in view of the relation of the die swell ratio to the melting point of the ethylene-1-butene copolymer, it is apparent that the die swell ratio deteriorates with the rise of the melting point. Therefore, any copolymer cannot be provided in which the die swell ratio regarding a neck-in which is a trouble at the time of the formation of a film or a sheet is controllable in a wide melting point range.

On the other hand, the copolymer disclosed in the above-mentioned (3) contains an α-olefin unit as an essential unit, and it does not cover any copolymer having a resin density of more than 0.92 g/cm$^3$. Furthermore, as in the above-mentioned (1), the obtained copolymer has a narrow molecular weight distribution and a narrow branching degree distribution, and both of these disadvantages cannot separately be controlled.

Moreover, WO94/07930 has disclosed a branched polyolefin having a straight-chain macromonomer segment as a branched component. In this technique, it has been clearly described that the activation energy of the melt flow and the melt tension increase as the effect of the long-chain branch, but there is neither any description regarding the swell ratio which is extremely important as the factor of the molding stability nor any description of a composition distribution which has a large influence on the physical properties of the polymer. In the analytical results of the macromonomers shown in examples, any description regarding an extremely important terminal unsaturated group is not present. Therefore, it is very indefinite whether or not the macromonomer is introduced into the polymer chain by the copolymerization.

On the other hand, a low-density polyethylene (LDPE) is most excellent in the working properties among presently existing polyethylenic resins, but its molecular structure is intricate and it has not all been elucidated so far. Nevertheless, it is apparent that the characteristics of the LDPE are attributed to the long-chain branch and its structure. Therefore, in order to control the swell ratio for the acquisition of the molding stability, such a mere introduction of the straight long-chain branch as disclosed in WO94/07930 is insufficient.

In the ethylenic copolymer obtained by the use of the metallocene catalyst, the molecular weight distribution is narrow and thus the branching degree distribution is also narrow as described above, so that highly branched low-molecular weight moieties are small and hence the improvement of heat-sealing properties and ESCR (environmental stress cracking resistance) can be expected. Furthermore, mechanical properties such as film impact can also be improved, but tearing strength inversely deteriorates. In addition, the ethylenic copolymer has a high uniformity, and for this reason, the transparency of the film is considered to be excellent.

On the other hand, the ethylenic copolymer obtained by the use of a conventional heterogeneous catalyst has a wide molecular weight distribution and a wide branching degree distribution. Particularly in the ethylenic copolymer, the highly branched low-molecular weight moieties are formed as by-products, and therefore the heat-sealing properties and ESCR tend to deteriorate, but the ethylenic copolymer has an advantage that the tearing strength is excellent.

As described above, the molecular weight distribution, the branching degree distribution, the long-chain branch and the structure have an extremely large influence on a resin performance, and the ethylenic copolymers in which these factors have optionally be controlled can suitably be used in various application fields.

On the other hand, when the branched ethylenic macromonomer is used as a comonomer, the long-chain branch can easily be introduced into the obtained copolymer without gelation, and as a result, the copolymer can possess the excellent molding and working properties. Furthermore, when the branched ethylenic macromonomer is hydrogenated, the branched ethylenic polymer having a low molecular weight can be obtained which are useful as a wax in various uses such as a base oil for a lubricating oil and an additive having a controlled viscosity index.

As understood from the foregoing, the branched ethylenic macromonomer is an extremely useful compound.

As a method for preparing a low-molecular weight polyethylene (a polyethylene wax), there has been disclosed a method which comprises the gaseous phase polymerization of ethylene in the presence of hydrogen by the use of a metallocene catalyst (Japanese Patent Application PCT-through Laid-open No. 502209/1991). In this method, however, hydrogen is used for the adjustment of the molecular weight, and therefore the content of a terminal vinyl group unavoidably deteriorates (in an α-olefin/ethylene copolymer system, it further deteriorates). In consequence, the thus obtained low-molecular weight polyethylene cannot be used as the macromonomer.

Furthermore, there has also been disclosed a method for polymerizing ethylene in the presence of a Ti(OR)$_4$ (R is an alkyl group or an aryl group) catalyst (Japanese Patent Application Laid-open No. 61932/1987). However, this method intends to prepare 1-butene, which is a dimer of ethylene, in a high yield, and in this case, the dimer and the trimer of ethylene as well as an ethylene/1-butene copolymer can be produced, but an ethylene oligomer which is useful as the macromonomer cannot be produced.

DISCLOSURE OF THE INVENTION

The present invention has been developed under such circumstances, and an object of the present invention is to provide a novel branched ethylenic macromonomer which can function as a comonomer to produce a copolymer having excellent molding and working properties and which can be hydrogenated to produce a branched ethylenic polymer having a low molecular weight as a wax useful in various uses, a copolymer having the excellent molding and working properties obtainable by using this macromonomer as a comonomer, and a branched ethylenic polymer having a low-molecular weight obtained by hydrogenating the macromonomer.

The present inventors have intensively researched to achieve the above-mentioned object, and as a result, it has been found that a branched ethylenic macromonomer which is derived from ethylene alone or from ethylene and one or more of an α-olefin, an cyclic olefin and a styrene and in which a molar ratio between a terminal methyl group and a vinyl group is within a specific range and which has a branch other than the branch directly derived from the α-olefin, the cyclic olefin and the styrene and which a ratio of vinyl groups to the total unsaturated groups and a weight-average molecular weight are within specific ranges can function as a comonomer to produce a copolymer having excellent molding and working properties, and a copolymer which can be obtained by copolymerizing the macromonomer with one or more of ethylene, the α-olefin, the cyclic olefin and the styrene and which contains macromonomer segments in a specific ratio and which has an intrinsic viscosity within a specific range is excellent in the molding and working properties. In addition, it has also been found that a branched ethylenic polymer having a low molecular weight which can be obtained by hydrogenating the branched ethylenic macromonomer and which does not substantially contain an unsaturated group is useful as a wax in various uses. The present invention has been completed on the basis of such knowledges.

That is to say, the present invention is directed to (1) a branched ethylenic macromonomer which is derivable from ethylene or derivable from ethylene and at least one selected from the group consisting of α-olefins having 3 to 20 carbon atoms, cyclic olefins and styrenes, (a) a molar ratio of a terminal methyl group to a vinyl group [the terminal methyl group/the vinyl group] in the macromonomer being in the range of 1 to 100, the macromonomer having a branch other than the branch directly derived from the α-olefin, the cyclic olefin or the styrene, (b) a ratio of vinyl groups to the total unsaturated groups in the macromonomer being 70 mol% or more, (c) a weight-average molecular weight (Mw) of the macromonomer in terms of a polyethylene measured by a gel permeation chromatography being in the range of 100 to 20,000, (2) a copolymer which is derivable from a branched ethylenic macromonomer described in the above-mentioned (1) and at least one selected from the group consisting of ethylene, α-olefins having 3 to 20 carbon atoms, cyclic olefins and styrenes, the content of a macromonomer segment in the copolymer being in the range of 0.001 to 90% by weight, an intrinsic viscosity of the copolymer measured in decalin at a temperature of 135° C. being in the range of 0.01 to 20 dl/g, and (3) a branched ethylenic polymer not substantially containing an unsaturated group which is obtainable by hydrogenating a branched ethylenic macromonomer described in the above-mentioned (1).

BEST MODE FOR CARRYING OUT THE INVENTION

A branched ethylenic macromonomer of the present invention can be derived from ethylene singly or derived from ethylene and at least one selected from the group consisting of α-olefins having 3 to 20 carbon atoms, cyclic olefins and styrenes. Here, examples of the α-olefins having 3 to 20 carbon atoms include propylene, 1-butene, 1-hexene, 1-octene, 1-decene, 1-eicosene, 4-methyl-1-pentene, 1-tetradecene and 3-methyl-1-butene. Examples of the cyclic olefins include norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 1,4,5,8-dimethanol-1,2,3,4,4a,5,8,8a-octahydronaphthalene, 2-methyl-1,4,5,8-dimethanol-1,2,3,4,4a,5,8,8a-octahydronaphthalene, 2-ethyl-1,4,5,8-dimethanol-1,2,3,4, 4a,5,8, 8a-octahydronaphthalene, 2,3-dimethyl-1,4,5,8-dimethanol-1,2,3,4,4a,5,8,8a-octahydronaphthalene, 2-hexyl-1,4,5,8-dimethano-1,2,3,4,4a,5,8,8a-octahydronaphthalene, 2-ethyliden-1,4,5,8-dimethano-1,2, 3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano1,2, 3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydride, 5-dimethylaminonorbornene and 5-cyananorbornene.

Examples of the styrenes include styrene, alkylstyrenes such as p-methylstyrene, o-methylstyrene, m-methylstyrene, 2,4-dimethylstyrene, 2,5-dimethylstyrene, 3,4-dimethylstyrene, 3,5-dimethylstyrene and p-tert-butylstyrene, halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene, vinylbiphenyls such as 4-vinylbiphenyl, 3-vinylbiphenyl and 2-vinylbiphenyl, and vinylphenylnaphthalenes such as 1-(4-vinylphenyl)-naphthalene, 2-(4-vinylphenyl)-naphthalene, 1-(3-vinylphenyl)-naphthalene, 2-(3-vinylphenyl)-naphthalene, 1-(2-vinylphenyl)-naphthalene and 2-(2-vinylphenyl)-naphthalene.

These monomers which can be copolymerized with ethylene may be used singly or in a combination of two or more thereof.

In the branched ethylenic macromonomer of the present invention, a molar ratio of a terminal methyl group to a vinyl group [the terminal methyl group/the vinyl group] is in the range of 1 to 100, and the macromonomer is required to have a branch. A copolymerized macromonomer has a branch other than the branch directly derived from the α-olefin, the cyclic olefin or the styrene. The branch present in this macromonomer is a short-chain branch whose main chain has 1 to 5 carbon atoms, such as a methyl branch, an ethyl branch, a propyl branch or a butyl branch, or a long-chain branch whose main chain has 6 or more carbon atoms, such as a hexyl branch or a branch having carbon atoms more than the hexyl branch. Two or more of these branches may be present in the macromonomer. The chain length of the branch preferably is 4 or more, more preferably 6 or more in terms of the number of carbon atoms. If the carbon atoms of the branch are less than 4, the various characteristics of the branched macromonomer, for example, the effect of imparting a sufficient molding stability to the copolymer of ethylene is poor. This branch may contain an α-olefin other than ethylene, a cyclic olefin or a styrene. The identification of the branch present in the macromonomer can be carried out in a usual manner by the use of $^{13}$C-NMR, when the branch has 4 or less carbon atoms. On the other hand, with regard to the long-chain branch having 6 or more carbon atoms, its presence can be confirmed by $^{13}$C-NMR, but its chain length cannot be determined. As effective means of the determination, there are an analysis of a molten fluid and an analysis of a macromonomer solution. According to these analytical means, the presence of the long-chain branch can be confirmed, and a difference between structures of the branched macromonomer and a straight-chain macromonomer can also be elucidated.

The vinyl group and the methyl branch can be determined by $^1$H-NMR (nuclear magnetic resonance spectrum) and the measurement of $^{13}$C-NMR [CDCl$_3$, 50° C. or TCB/C$_6$D$_6$ (80/20 v/v), measured at 130° C.].

That is to say, in the measurement of $^1$H-NMR, peaks attributed to the vinyl group are present at 4.8–5.0 ppm and 5.6–5.8 ppm, and an intensity ratio of the peak of the methyl group at 0.7–0.9 ppm to the peak of the vinyl group at 4.8–5.0 ppm is usually $$1.0 < (0.7\text{–}0.9 \text{ ppm})/(4.8\text{–}5.0 \text{ ppm}) \leq 150$$

preferably $$1.5 < (0.7\text{–}0.9 \text{ ppm})/(4.8\text{–}5.0 \text{ ppm}) \leq 100.$$

Furthermore, in the measurement of $^{13}$C-NMR, the ethyl branch bonded to a quaternary carbon which is observed in LDPE (low-density polyethylene) is not present (the methyl group: 8 ppm).

In the branched ethylenic macromonomer, a ratio of the vinyl groups to the total unsaturated groups is required to be 70 mol % or more, preferably 75 mol % or more, more preferably 80 mol % or more. If this ratio is less than 70 mol %, the copolymerization efficiency of the macromonomer deteriorates.

Furthermore, with regard to the branched ethylenic macromonomer, its weight-average molecular weight (Mw) in terms of a polyethylene measured by a gel permeation chromatography is required to be in the range of 100 to 20,000, preferably 150 to 18,000, more preferably 180 to 16,000.

On the other hand, the copolymer of the present invention can be derived from the branched ethylenic macromonomer and at least one selected from the group consisting of ethylene, α-olefins having 3 to 20 carbon atoms, cyclic olefins and styrenes. Examples of the α-olefins having 3 to 20 carbon atoms, the cyclic olefins and the styrenes include those enumerated in the aforesaid description of the branched ethylenic macromonomer. These monomers which can be copolymerized with the branched ethylenic macromonomer can be used singly or in a combination of two or more thereof.

In the copolymer of the present invention, the content of a branched ethylenic macromonomer segment is required to be in the range of 0.001 to 90% by weight, preferably 0.002 to 85% by weight, more preferably 0.01 to 80% by weight. If the content of the macromonomer segment is less than 0.001% by weight, the copolymer is poor in non-Newtonian properties and melt tension, so that the improvement effect of the molding and working properties cannot sufficiently be exerted. If it is more than 90% by weight, the mechanical strength of the copolymer deteriorates.

The content of the macromonomer segment can be calculated from a difference between the yield of the polymer and the amount of the reacted olefin obtained by subtracting the amount of the unreacted olefin from that of the fed olefin. Furthermore, in the case of the ethylene/macromonomer system, the content of the macromonomer segment can also be calculated from a molar ratio between a main chain methylene group and a methyl group based on the macromonomer segment. In this case, the molar ratio between the methylene group and the methyl group [the methylene group/the methyl group] is usually in the range of 1.5 to 3000.

In the copolymer of the present invention, it is preferred that the weight-average molecular weight (Mw) and a die swell ratio (D$_R$) meet the equation $$D_R > 0.5 + 0.125 \times \log Mw,$$

preferably $$1.80 > DR > 0.36 + 0.159 \times \log Mw,$$

more preferably $$1.75 > DR > 0.16 + 0.210 \times \log Mw,$$

most preferably $$1.70 > DR > -0.11 + 0.279 \times \log Mw.$$

If DR is not more than [0.5+0.125×logMw], the sufficient swell cannot be obtained, and a problem such as a neck-in takes place at the time of extrusion.

Here, the die swell ratio (D$_R$) is a value (D$_1$/D$_0$) obtained by measuring a diameter (D$_1$, mm) of a strand formed by extrusion through a capillary nozzle [diameter (D$_0$)=1.275 mm, length (L)=51.03 mm, L/D$_0$=40, and entrance angle=90°] at an extrusion speed of 1.5 mm/min (shear rate=10 sec$^{-1}$) at a temperature of 190° C. by the use of a capillograph made by Toyo Seiki Seisakusho Co., Ltd., and then dividing this diameter by the diameter of the capillary nozzle.

The above-mentioned diameter (D$_1$) of the strand is an average value of values obtained by measuring long axes and short axes of central portions of 5 samples having a extruded strand length of 5 cm (a length of 5 cm from a nozzle outlet).

Moreover, in the copolymer, it is suitable that a relation between a half value width [W (°C.)] of the main peak of a composition distribution curve obtained by a temperature rising elution fractionation method and the temperature position [T (°C.)] of a main peak top meets the equation $$W \geq -24.9 + 2470/T$$

preferably $$W \geq -23.9 + 2470/T$$

more preferably $$W \geq -21.9 + 2470/T$$

much more preferably $$W \geq -20.0 + 2470/T$$

most preferably $$W \geq -18.0 + 2470/T.$$

If this W is less than [−24.9+2470/T], the copolymer is unpreferably poor in melt physical properties and mechanical properties.

The above-mentioned W and T are values obtained by the following temperature rising elution fractionation method. That is to say, a polymer solution of o-dichlorobenzene whose concentration is adjusted to about 6 g/liter at 135° C. is injected, by a constant delivery pump, into a column having an inner diameter of 10 mm and a length of 250 mm which is filled with Chromosorb PNAN (80/100 mesh) as a column filler. The polymer solution is cooled to room temperature at a rate of 10° C./hr, so that the polymer is adsorbed and crystallized on the filler. Afterward, o-dichlorobenzene is fed at a feed rate of 2 cc/min under heat-up rate conditions of 20° C./hr. Then, the concentration of the eluted polymer is measured by an infrared detector (device: 1-A Fox Boro CVF Co., Ltd., cell: $CaF_2$), and the composition distribution curve to an elution temperature is depicted to obtain W and T.

The copolymer of the present invention may be any of a random copolymer, a block copolymer and a graft copolymer, and in the case that the α-olefin having 3 to 20 carbon atoms is used, the copolymer may contain any stricture of an atactic structure, an isotactic structure and a syndiotactic structure. An intrinsic viscosity of the copolymer measured in decalin at a temperature of 135° C. is required to be in the range of 0.01 to 20 dl/g, preferably 0.05 to 18 dl/g, more preferably 0.1 to 15 dl/g. If this intrinsic viscosity is less than 0.01 dl/g, the copolymer is poor in mechanical properties, and if it is more than 20 dl/g, its molding and working properties deteriorate. In addition, a ratio Mw/Mn of a weight-average molecular weight (Mw) to a number-average molecular weight (Mn) of the copolymer in terms of a polyethylene measured by a gel permeation chromatography is usually in the range of 1.5 to 70.

The branched ethylenic macromonomer of the present invention can be prepared by polymerizing ethylene singly or polymerizing ethylene and at least one selected from the group consisting of α-olefins having 3 to 20 carbon atoms, cyclic olefins and styrenes in the presence of a polymerization catalyst which permits the production of the macromonomer having the above-mentioned characteristics. Furthermore, the copolymer of the present invention can be prepared by copolymerizing the branched ethylenic macromonomer and at least one selected from the group consisting of ethylene, α-olefins having 3 to 20 carbon atoms, cyclic olefins and styrenes in the presence of a polymerization catalyst.

An example of the polymerization catalyst which can be used in the preparation of the branched ethylenic macromonomer and the copolymer contains, as main components, (A) a transition metal compound and (B) a compound capable of forming an ionic complex from the transition metal compound or its derivative.

As the transition metal compound of the component (A) in the catalyst, there can be used a transition metal compound containing a metal in the groups 3 to 10 of the periodic table or a metal of a lanthanide series. Examples of such a transition metal compound includes various kinds of compounds, and compounds containing transition metals in the groups 4, 5 and 6 can be suitably used. Particularly suitable are compounds represented by the general formulae $$CpM^1R^1{}_aR^2{}_bR^3{}_c \qquad (I)$$

$$Cp_2M^1R^1{}_aR^2{}_b \qquad (II)$$

$$(Cp-A_e-Cp)M^1R^1{}_aR^2{}_b \qquad (III)$$

or the general formula $$M^1R^1{}_aR^2{}_bR^3{}_cR^4{}_d \qquad (IV)$$

and their derivatives.

In the above-mentioned general formulae (I) to (IV), $M^1$ represents a transition metal such as titanium, zirconium, hafnium, vanadium, niobium and chromium, and Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. $R^1$, $R^2$, $R^3$ and $R^4$ each independently represents a σ-bond ligand, a chelate ligand or a ligand such as a Lewis base, and typical examples of the a-bond ligand include a hydrogen atom, an oxygen atom, a halogen atom, an alkyl group having 1 to 20 carbon atoms, an alkoxy group having 1 to 20 carbon atoms, an aryl group, an alkylaryl group or an arylalkyl group having 6 to 20 carbon atoms, an acyloxy group having 1 to 20 carbon atoms, an allyl group, a substituted allyl group, and a substituent containing a silicon atom. In addition, examples of the chelate ligand include an acetylacetonato group and a substituted acetylacetonato group. A represents a crosslinkage by a covalent bond. a, b, c and d each is independently an integer of 0 to 4, and e is an integer of 0 to 6. Two or more of $R^1$, $R^2$, $R^3$ and $R^4$ may bond to each other to form a ring. In the case that the above-mentioned Cp has a substituent, this substituent is preferably an alkyl group having 1 to 20 carbon atoms. In the formulae (II) and (III), the two Cps may be the same or different from each other.

Examples of the substituted cyclopentadienyl group in the above-mentioned formulae (I) to (III) include a methylcyclopentadienyl group, an ethylcyclopentadienyl group, an isopropylcyclopentadienyl group, a 1,2-dimethylcyclopentadienyl group, a tetramethylcyclopentadienyl group, a 1,3-dimethylcyclopentadienyl group, a 1,2,3-trimethylcyclopentadienyl group, a 1,2,4-trimethylcyclopentadienyl group, a pentamethylcyclopentadienyl group and a trimethylsilylcyclopentadienyl group. Furthermore, typical examples of $R^1$ to $R^4$ in the above-mentioned formulae (I) to (IV) include a fluorine atom, a chlorine atom, a bromine atom and an iodine atom as the halogen atoms; a methyl group, an ethyl group, an n-propyl group, an isopropyl group, an n-butyl group, an octyl group and a 2-ethylhexyl group as the alkyl groups having 1 to 20 carbon atoms; a methoxy group, an ethoxy group, a propoxy group, a butoxy group and a phenoxy group as the alkoxy groups having 1 to 20 carbon atoms; a phenyl group, a tolyl group, a xylyl group and a benzyl group as the aryl groups, the alkylaryl groups or the arylalkyl groups having 6 to 20 carbon atoms; a heptadecylcarbonyloxy group as the acyloxy group having 1 to 20 carbon atoms; a trimethylsilyl group and a (trimethylsilyl)methyl group as the substituent containing a silicon atom; and ethers such as dimethyl ether, diethyl ether and tetrahydrofuran, a thioether such as tetrahydrothiophene, an ester such as ethyl benzoate, nitrites such as acetonitrile and benzonitrile, amines such as trimethylamine, triethylamine, tributylamine, N,N-dimethylaniline, pyridine, 2,2'-bipyridine and phenanthroline, phosphines such as triethylphosphine and triphenylphosphine, chain unsaturated hydrocarbons such as ethylene, butadiene, 1-pentene, isoprene, pentadiene, 1-hexene and their derivatives, and cyclic unsaturated hydrocarbons such as benzene, toluene, xylene, cycloheptatriene, cyclooctadiene, cyclooctatriene, cyclooctatetraene and their derivatives as the Lewis base. In addition, examples of the crosslinkage by the covalent bond of A in the formula (III) include a methylene crosslinkage, a dimethylmethylene crosslinkage, an ethylene crosslinkage, a 1,1'-cyclohexylene crosslinkage, a dimethylsilylene crosslinkage, a dimethylgermilene crosslinkage and a dimethylstanilene crosslinkage.

Examples of the compound represented by the general formula (I) include (pentamethylcyclopentadienyl)trimethylzirconium, (pentamethylcyclopentadienyl)triphenylzirconium, (pentamethylcyclopentadienyl)tribenzylzirconium, (pentamethylcyclopentadienyl)trichlorozirconium, (pentamethylcyclopentadienyl)trimethoxyzirconium, (cyclopentadienyl)trimethyzirconium, (cyclopentadienyl)triphenylzirconium, (cyclopentadienyl)tribenzylzirconium, (cyclopentadienyl)trichlorozirconium, (cyclopentadienyl)trimethoxyzirconium, (cyclopentadienyl)dimethyl(methoxy)zirconium, (methylcyclopentadienyl)trimethylzirconium, (methylcyclopentadienyl)triphenylzirconium, (methylcyclopentadienyl)tribenzylzirconium, (methylcyclopentadienyl)trichlorozirconium, (methylcyclopentadienyl)dimethyl(methoxy)zirconium, (dimethylcyclopentadienyl)trichlorozirconium, (trimethylcyclopentadienyl)trichlorozirconium, (trimethylcyclopentadienyl)trimethylzirconium, (tetramethylcyclopentadienyl)trichlorozirconium, and these compounds in which zirconium is replaced with titanium or hafnium.

Examples of the compound represented by the general formulae (II) include
bis(cyclopentadienyl)dimethylzirconium, bis(cyclopentadienyl)diphenylzirconium, bis(cyclopentadienyl)diethylzirconium, bis(cyclopentadienyl)dibenzylzirconium, bis(cyclopentadienyl)dimethoxyzirconium, bis(cyclopentadienyl)dichlorozirconium, bis(cyclopentadienyl)dihydridozirconium, bis(cyclopentadienyl)monochloromonohydridozirconium, bis(methylcyclopentadienyl)dimethylzirconium, bis(methylcyclopentadienyl)dichlorozirconium, bis(methylcyclopentadienyl)dibenzylzirconium, bis(pentamethylcyclopentadienyl)dimethylzirconium, bis(pentamethylcyclopentadienyl)dichlorozirconium, bis(pentamethylcyclopentadienyl)dibenzylzirconium, bis(pentamethylcyclopentadienyl)chloromethylzirconium, bis(pentamethylcyclopentadienyl)hydridomethylzirconium, (cyclopentadienyl)(pentamethylcyclopentadienyl)dichlorozirc onium, and these compounds in which zirconium is replaced with titanium or hafnium.

Furthermore, examples of the compound represented by the general formula (III) include
ethylenebis(indenyl)dimethylzirconium, ethylenebis(indenyl)dichlorozirconium, ethylenebis(tetrahydroindenyl)dimethylzirconium, ethylenebis(tetrahydroindenyl)dichlorozirconium, dimethylsilylenebis(cyloropentadienyl)dimethylzirconium, dimethylsilylenebis(cyloropentadienyl)dichlorozirconium, isopropylidene(cyloropentadienyl)(9-fluorenyl)dimethylzirconium, isopropylidene(cyloropentadienyl)(9-fluorenyl)dichlorozirconium, [phenyl(methyl)methylene](9-fluorenyl)(cycylopentadienyl)dimethylzirconium, diphenylmethylene(cyclopentadienyl)(9-fluorenyl)dimethylzirconium, ethylene(9-fluorenyl)(cyclopentadienyl)dimethylzirconium, cyclohexalidene(9-fluorenyl)(cyclopentadienyl)dimethylzirconium, cyclopentylidene(9-fluorenyl)(cyclopentadienyl)dimethylzirconium, cyclobutylidene(9-fluorenyl)(cyclopentadienyl)dimethylzirconium, dimethylsilylene(9-fluorenyl)(cyclopentadienyl)dimethylzirconium, dimethylsilylenebis(2,3,5-trimethylcyclopentadienyl)dichlorozirconium, dimethylsilylenebis(2,3,5-trimethylcyclopentadienyl)dimethylzirconium, dimethylsilylenebis(indenyl)dichlorozirconium, and these compounds in which zirconium is replaced with titanium or hafnium.

Moreover, examples of the compound represented by the general formula (IV) include tetramethylzirconium, tetrabenzylzirconium, tetramethoxyzirconium, tetraethoxyzirconium, tetrabutoxyzirconium, tetrachlorozirconium, tetrabromozirconium, butoxytrichlorozirconium, dibutoxydichlorozirconium, bis(2,5-di-t-butylphenoxy)dimethylzirconium, bis(2,5-di-t-butylphenoxy)dichlorozirconium, zirconium bis(acetylacetonato), and these compounds in which zirconium is replaced with titanium or hafnium.

Typical examples of the vanadium compound include vanadium trichloride, vanadyl trichloride, vanadium triacetylacetonate, vanadium tetrachloride, vanadium tributoxide, vanadyl dichloride, vanadyl bisacetylacetonate, vanadyl triacetylacetonate, dibenzenevanadium, dicyclopentadienylvanadium, dicyclopentadienylvanadium dichloride, cyclopentadienylvanadium dichloride and dicyclopentadienylmethylvanadium.

Next, typical examples of the chromium compound include tetramethylchromium, tetra(t-butoxy)chromium, bis(cyclopentadienyl)chromium, hydridotricarbonyl(cyclopentadienyl)chromium, hexacarbonyl(cyclopentadienyl)chromium, bis(benzene)chromium, tricarbonyltris(triphenyl phosphonate)chromium, tris(allyl)chromium, triphenyltris(tetrahydrofuran)chromium and chromium tris(acetylacetonate).

Furthermore, as the component (A), there can suitably be used a group 4 transition compound having, as the ligand, a multiple ligand compound in which in the above-mentioned general formula (III), two substituted or unsubstituted conjugated cyclopentadienyl groups (however, at least one of which is a substituted cyclopentadienyl group) is bonded to each other via an element selected from the group 14 of the periodic table.

An example of such a compound is a compound represented by the general formula (V)

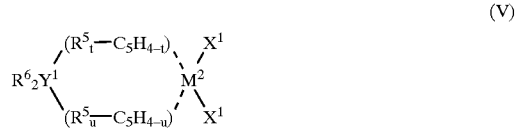

or its derivative.

In the above-mentioned general formula (V), $Y^1$ represents a carbon atom, a silicon atom, a germanium atom or a tin atom, $R^5{}_t$—$C_5H_{4-t}$ and $R^5{}_u$—$C_5H_{4-u}$ each represents a substituted cyclopentadienyl group, and t and u each are an integer of 1 to 4. Here, $R^5$s each represents a hydrogen atom, a silyl group or a hydrocarbon group, and they may be the same or different from each other. In at least either of the cyclopentadienyl groups, $R^5$ is present on at least either of carbon atoms adjacent to the carbon atom bonded to $Y^1$. $R^6$ represents a hydrogen atom, an alkyl group having 1 to 20 carbon atoms, or an aryl group, an alkylaryl group or an arylalkyl group having 6 to 20 carbon atoms. $M^2$ represents a titanium atom, a zirconium atom or a hafnium atom, $X^1$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. $X^1$ may be the same or different from each other, and similarly, $R^6$ is may be the same or different from each other.

Examples of the substituted cyclopentadienyl group in the general formula (V) include a methylcyclopentadienyl group, an ethylcyclopentadienyl group, an isopropylcyclopentadienyl group, a 1,2-dimethylcyclopentadienyl group, a 1,3-dimethylcyclopentadienyl group, a 1,2,3-trimethylcyclopentadienyl group and a 1,2,4-trimethylcyclopentadienyl group. Typical examples of $X^1$ include F, Cl, Br and I as the halogen atoms; a methyl group, an ethyl group, an n-propyl group, an isopropyl group, an n-butyl group, an octyl group and a 2-ethylhexyl group as the alkyl group having 1 to 20 carbon atoms; a methoxy group, an ethoxy group, a propoxy group, a butoxy group and a phenoxy group as the alkoxy groups having 1 to 20 carbon atoms; and a phenyl group, a tolyl group, a xylyl group and a benzyl group as the aryl group, the alkylaryl group or the arylalkyl group having 6 to 20 carbon atoms. Typical examples of the $R^6$ include a methyl group, an ethyl group, a phenyl group, a tolyl group, a xylyl group and a benzyl group.

In addition, the compound having the general formula (V) also includes compounds represented by the general formula (VI):

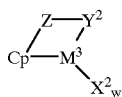

(VI)

In the compound of the general formula (VI), Cp represents a cyclic unsaturated hydrocarbon group or a chain unsaturated hydrocarbon group such as a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group. $M^3$ represents a titanium atom, a zirconium atom or a hafnium atom, $X^2$ represents a hydrogen atom, a halogen atom, an alkyl group having 1 to 20 carbon atoms, an aryl group, an alkylaryl group or an arylalkyl group having 6 to 20 carbon atoms, or an alkoxy group having 1 to 20 carbon atoms. Z represents $SiR^7{}_2$, $CR^7{}_2$, $SiR^7{}_2SiR^7{}_2$, $CR^7{}_2CR^7{}_2$, $CR^7{}_2CR^7{}_2CR^7{}_2$, $CR^7=CR^7$, $CR^7{}_2SiR^7{}_2$ or $GeR^7{}_2$, and $Y^2$ represents —N($R^6$)—, —O—, —S— or —P($R^6$)—. The above-mentioned $R^7$ is a group selected from the group consisting of a hydrogen atom, an alkyl group having 20 or less non-hydrogen atoms, an aryl group, a silyl group, a halogenated alkyl group, a halogenated aryl group and a combination thereof, and $R^8$ is an alkyl group having 1 to 10 carbon atoms or an aryl group having 6 to 10 carbon atoms, or R8 may form a condensed ring of one or more $R^7$s and 30 or less non-hydrogen atoms. Moreover, w represents 1 or 2.

Typical examples of the compound represented by the general formula (VI) include (tert-butylamido)(tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido) (tetramethyl-$\eta^5$-cyclopentadienyl) -1,2-ethanediyltitanium dichloride, (ethylamido)(tetramethyl-$\eta^5$-cyclopentadienyl)-methylenetitanium dichloride, (tertbutylamido)dimethyl(tetramethyl-$\eta^5$-cyclopentadienyl) silanetitanium dichloride, (tert-butylamido)dimethyl (tetramethyl-$\eta^5$-cyclopentadienyl)silanezirconium dibenzyl, (benzylamido)dimethyl(tetramethyl-$\eta^5$-cyclopentadienyl) silanetitanium dichloride and (phenylphosphide)dimethyl (tetramethyl-$\eta^5$-cyclopentadienyl)silanezirconium dibenzyl.

Furthermore, as the transition metal compound which is the component (A), there can also be used a reaction product of a transition metal compound represented by the general formula (IV) in which at least two halogen atoms, an alkoxy group, or the two halogen atoms and the alkoxy group are bonded to a central metal and any one of diols represented by the general formulae (VII) to (XII):

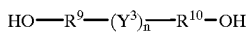

(VII)

(VIII)

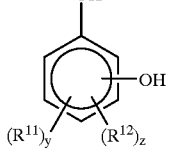

(IX)

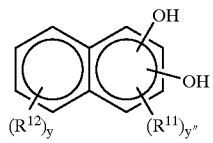

(X)

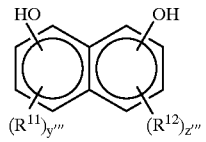

(XI)

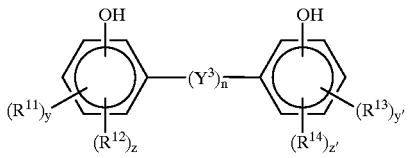

(XII)

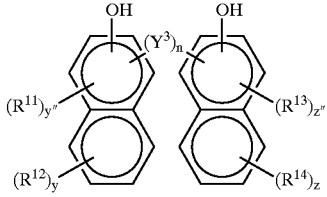

In the compounds represented by the general formulae (VII) to (XII), $R^9$ and $R^{10}$ are each a hydrocarbon group having 1 to 20 carbon atoms, and they may be the same of different from each other, Y³ is a hydrocarbon group having 1 to 20 carbon atoms, or a group represented by

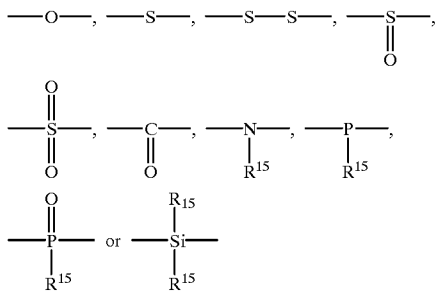

wherein $R^{15}$ is a hydrocarbon group having 1 to 6 carbon atoms. Examples of the hydrocarbon group having 1 to 20 carbon atoms which is represented by $R^9$, $R^{10}$ and $y^3$ include methylene, ethylene, trimethylene, propylene, diphenylmethylene, ethylidene, n-propylidene, isopropylidene, n-butylidene and isobutylidene, and above all, methylene, ethylene, ethylidene, isopropylidene and isobutylidene are preferable. n is an integer of 0 or more, and 0 or 1 is particularly preferable.

Furthermore, $R^{11}$, $R^{12}$, $R^{13}$ and $R^{14}$ are each a hydrocarbon group having 1 to 20 carbon atoms, a hydroxyl group, a nitro group, a nitrile group, a hydrocarbyloxy group or a halogen atom, and they may be the same or different from each other. Examples of the hydrocarbon group having 1 to 20 carbon atoms include alkyl groups such as methyl, ethyl, n-propyl, isopropyl, n-butyl, isobutyl, t-butyl, n-amyl, isoamyl, n-hexyl, n-heptyl, n-octyl, n-decyl and n-dodecyl; aryl groups such as phenyl and naphthyl; cycloalkyl groups such as cyclohexyl and cyclopentyl; an alkenyl group such as propenyl; and an aralkyl group such as benzyl, and above all, the alkyl groups having 1 to 10 carbon atoms are preferable. y, y', y", y'", z, z', z" and z'" are each the number of substituents bonded to an aromatic ring, and y, y', z and z' are each an integer of 0 to 4, y" and z" are each an integer of 0 to 2, and y'" and z'" are each an integer of 0 to 3.

One example of the reaction product of the transition metal compound and each of the diols represented by the general formulae (VII) to (XII) is a compound represented by the general formula (XIII):

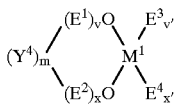

(XIII)

In the general formula (XIII), $M^1$ is as defined above, $E^1$ and $E^2$ are each a hydrocarbon group having 1 to 20 carbon atoms, v and x are each 0 or 1, and $E^1$ and $E^2$ form a crosslinking structure via $y^4$. $E^3$ and $E^4$ are each a σ-bond ligand, a chelate ligand or a Lewis base, and they may be the same or different from each other.

v' and x' are each an integer of 0 to 2 [v'+x'=an integer of (the valence of $M^1$–2)]. $y^4$ is a hydrocarbon group having 1 to 20 carbon atoms, $E^5E^6Y^5$, an oxygen atom or a sulfur atom, and m is an integer of 0 to 4. $E^5$ and $E^6$ are each a hydrocarbon group having 1 to 20 carbon atoms, and $Y^5$ is a carbon atom or a silicon atom.

In the preparation of the branched ethylenic macromonomer, the particularly preferable transition metal compound is an alkoxy compound of titanium.

Furthermore, as the transition metal compound of the component (A), there can be used a multiple crosslinking type compound having a structure represented by the general formula (XIV):

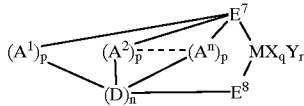

(XIV)

In the above-mentioned general formula (XIV), M is a metallic element in the groups 3 to 10 or a lanthanoide series of the periodic table, and typical examples of M include titanium, zirconium, hafnium, yttrium, vanadium, chromium, manganese, nickel, cobalt, palladium and lanthanoide metals. Above all, titanium, zirconium and hafnium are preferable from the viewpoint of an olefin polymerization activity. $E^7$ and $E^8$ are each a σ-bonding or a π-bonding ligand, and they form a crosslinking structure via $(A^1)_p$, $(A^2)_p$, ... $(A^n)_p$ and $(D)_s$ and may be the same or different. Typical examples of $E^7$ include a cyclopentadienyl group, a substituted cyclopentadienyl group, an indenyl group, a substituted indenyl group, a heterocyclopentadienyl group, a substituted heterocyclopentadienyl group, an amido group (—N<), a phosphide group (—P<), a hydrocarbon group (>CR— or >C<), a silicon-containing group (>SiR— or >Si<) (wherein R is hydrogen, a hydrocarbon group having 1 to 20 carbon atoms, or a hetero-atom-containing group). Typical examples of $E^8$ include a cyclopentadienyl group, a substituted cyclopentadienyl group, an indenyl group, a substituted indenyl group, a heterocyclopentadienyl group, a substituted heterocyclopentadienyl group, an amido group (—N< or —NR—), a phosphide group (—P< or —PR—), oxygen (—O—), sulfur (—S—), selenium (—Se—), a hydrocarbon group (>C(R)₂—, >CR— or >>C<), a silicon-containing group (>SiR—, >Si(R)₂— or >Si<) (wherein R is hydrogen, a hydrocarbon group having 1 to :?0 carbon atoms, or a hetero-atom-containing group).

Furthermore, X is a σ-bonding ligand, and when a plurality of Xs are present, these plural Xs may be the same or different, and each X may crosslink with another X, $E^7$, $E^8$ or Y. Typical examples of X include a halogen atom, a hydrocarbon group having 1 to 20 carbon atoms, an alkoxy group having 1 to 20 carbon atoms, an aryloxy group having 6 to 20 carbon atoms, an amido group having 1 to 20 carbon atoms, a silicon-containing group having 1 to 20 carbon atoms, a phosphide group having 1 to 20 carbon atoms, a sulfide group having I to 20 carbon atoms and an acyl group having 1 to 20 carbon atoms. On the other hand, Y is a Lewis base, and when a plurality of Ys are present, these plural Ys may be the same or different, and each Y may crosslink with another Y, $E^7$, $E^8$ or X. Typical examples of the Lewis base which is represented by Y include an amine, an ether, a phosphine and a thioether.

Next, $A^1$, $A^2$, An are each a crosslinking group and they may be the same or different. Typical examples of this crosslinking group include groups having a structure in which the crosslinking is made with one carbon atom, such as methylene, ethylene, ethylidene, isopropylidene, cyclohexylidene, 1,2-cyclohexylene and vinylidene (CH₂=C=).

Other typical structures of $A^1$, $A^2$, ... $A^n$ include R'₂Si, R'₂Ge, R'₂Sn, R'Al, R'P, R'P (=O), R'N, oxygen (—O—), sulfur (—S—) and selenium (—Se—) wherein R' is a hydrogen atom, a halogen atom, a hydrocarbon group having 1 to 20 carbon atoms, a halogen-containing hydrocarbon group having 1 to 20 carbon atoms, a silicon-containing group or a hetero-atom-containing group, and when two Rs are present, they may be the same or different and may bond to each other to form a ring structure. Typical examples of these crosslinking groups include dimethylsilylene, tetramethyldisilylene, dimethylgermylene, dimethylstannylene, methylborilidene (CH$_3$—B<), methylalumilidene (CH$_3$—Al<), phenylphosphilidene (Ph—P<), phenylphospholidene

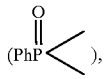

methylimide, oxygen (—O—), sulfur (—S—) and selenium (—Se—). In addition, examples of $A^1$, $A^2$, . . . $A^n$ include vinylene (—CH=CH—), o-xylylene

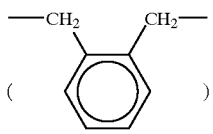

and 1,2-phenylene.

D represents a crosslinking group, and when a plurality of Ds are present, these plural Ds may be the same or different. Typical examples of D include R"C, R"Si, R"Ge, R"Sn, B, Al, P, P(=O) and N wherein R" is a hydrogen atom, a halogen atom, a hydrocarbon group having 1 to 20 carbon atoms, a halogen-containing hydrocarbon group having 1 to 20 carbon atoms, a silicon-containing group or a hetero-atom-containing group. Furthermore, n is an integer of 2 to 4; p is an integer of 1 to 4, and the respective ps may be the same or different; q is an integer of 1 to 5 [(the valence of M)−2]; r is an integer of 0 to 3; and s is an integer of 0 to 4, and when s is 0, $(A^1)_p$, $(A^2)_p$, . . . $(A^n)_p$ and $E^2$ form a direct bond.

Of the compounds represented by the above-mentioned general formula (XIV), a transition metal compound represented by the following general formula (XV) is preferable in which s is 0, i.e., any crosslinking group of D is not present:

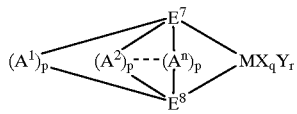 (XV)

wherein M, $E^7$, $E^8$, X, Y, $A^1$, $A^2$, . . . $A^n$, n, p, q and r are as defined above.

Typical examples of such a transition metal compound include (1,1'-dimethylsilylene)(2,2'-isopropylidene)bis(cyclopentadienyl)zirconium dichloride, (1,1'-dimethylsilylene)(2,2'-dimethylsilylene)-bis(cyclopentadienyl)zirconium dichloride, (1,1'-dimethylsilylene)(2,2'-isopropylidene)-bis(cyclopentadienyl)zirconiumdimethyl, (1,1'-dimethylsilylene)(2,2'-isopropylidene)-bis(cyclopentadienyl)zirconiumdibenzyl, (1,1'-dimethylsilylene)(2,2'-isopropylidene)-bis(cyclopentadienyl)zirconiumbis(trimethylsilyl), (1,1'-dimethylsilylene)(2,2'-isopropylidene)-bis(cyclopentadienyl)zirconiumbis(trimethylsilylmethyl), (1,1'-dimethylsilylene)(2,2'-isopropylidene)-bis(cyclopentadienyl)zirconium dimethoxide, (1,1'-dimethylsilylene)(2,2'-isopropylidene)-bis(cyclopentadienyl)zirconiumbis(trifluoromethane sulfonate), (1,1'-dimethylsilylene)(2,2'-methylene)-bis(cyclopentadienyl)zirconium dichloride, (1,1'-ethylene)(2,2'-methylene)-bis(cyclopentadienyl)zirconium dichloride, (1,2'-dimethylsilylene)(2,1'-ethylene)-bis-(indenyl)zirconium dichloride, (1,1'-dimethylsilylene)(2,2'-ethylene)-bis(indenyl)zirconium dichloride, (1,1'-ethylene)-(2,2'-dimethylsilylene)-bis(indenyl)zirconium dichloride, (1,1'-dimethylsilylene)(2,2'-cyclohexylidene)-bis(indenyl)zirconium dichloride, (1,2'-dimethylsilylene)(2,1'-isopropylidene)-bis(indenyl)zirconium dichloride, (1,1'-isopropylidene)(2,2'-dimethylsilylene)-bis(indenyl)zirconium dichloride, (1,1'-dimethylsilylene)(2,2'-isopropylidene)-bis(indenyl)zirconium dichloride, (1,1'-dimethylsilylene)(2,2'-isopropylidene)-bis(indenyl)zirconium dimethyl, (1,1'-dimethylsilylene)(2,2'-isopropylidene)-bis(indenyl)zirconiumdibenzyl, (1,1'-dimethylsilylene)(2,2'-isopropylidene)bis(indenyl)zirconiumbis(trimethylsilyl), (1,1'-dimethylsilylene)(2,2'-isopropylidene)-bis(indenyl)zirconiumbis(trimethylsilylmethyl), (1,1'-dimethylsilylene)(2,2'-isopropylidene)-bis(indenyl)zirconium dimethoxide, (1,1'-dimethylsilylene)(2,2'-isopropylidene)-bis(indenyl)zirconiumbis(trifluoromethane sulfonate), (1,1'-dimethylsilylene)(2,2'-isopropylidene)-bis(4,5,6,7-tetrahydroindenyl)zirconium dichloride, (1,2'-ethylene)(2,1'-isopropylidene)-bis(indenyl)zirconium dichloride, (1,1'-ethylene)(2,2'-isopropylidene)-bis(indenyl)zirconium dichloride, (1,1'-isopropylidene)(2,2'-ethylene)-bis(indenyl)zirconium dichloride, (1,1'-isopropylidene)(2,2'-isopropylidene)-bis(cyclopentadienyl)zirconium dichloride, (1,1'-dimethylsilylene)(2,2'-isopropylidene)-(3,4-dimethylcyclopentadienyl)(3',4'-dimethylcyclopentadienyl)zirconium dichloride, (1,1'-dimethylsilylene)(2,2'-isopropylidene)-(4-methylcyclopentadienyl)(4'-methylcyclopentadienyl)zirconium dichloride, (1,1'-dimethylsilylene)(2,2'-isopropylidene)(3,4,5-trimethylcyclopentadienyl)(3',4',5'-trimethylcyclopentadienyl)zirconium dichloride, (1,1'-dimethylsilylene)(2,2'-isopropylidene)-(4-n-butylcyclopentadienyl)(4'-n-butylcyclopentadienyl)zirconium dichloride, (1,1 -dimethylsilylene)(2,2'-isopropylidene)(4-tert-butylcyclopentadienyl)(4'-tert-butylcyclopentadienyl)zirconium dichloride, (1,2'-dimethylsilylene)(2,1'-isopropylidene)-(3-methylindenyl)(3'-methylindenyl)zirconium dichloride, (1,1'-dimethylsilylene)(2,2'-isopropylidene)-(3-methylindenyl)(3'-methylindenyl)zirconium dichloride, (1,1'-isopropylidene)(2,2'-dimethylsilylene)-(3-methylindenyl)(indenyl)zirconium dichloride, (1,1'-dimethylsilylene)(2,2'-isopropylidene)(4,7-dimethylindenyl)(indenyl)zirconium dichloride, (1,1'-dimethylsilylene)(2,2'-isopropylidene)-(4,5-benzoindenyl)(indenyl)zirconium dichloride, (1,1'-dimethylsilylene)(2,2'-isopropylidene)-(4,7-dimethylindenyl)(4',7'-dimethyl-indenyl)zirconium dichloride, (1,1'-dimethylsilylene)(2,2'-isopropylidene)-(4,5-benzoindenyl)(4,5-benzoindenyl)zirconium dichloride, (1,1'-dimethylsilylene)(2,2'-isopropylidene)-(3-methylindenyl)(3'-methylindenyl)zirconium dichloride, (1,1'-dimethylsilylene)(2,2'-isopropylidene)-(3-ethylindenyl)(3'-ethylindenyl)zirconium dichloride, (1,1'-dimethylsilylene)(2,2'-isopropylidene)-(3-n-butylindenyl)(3'-n-butylindenyl)zirconium dichloride, (1,1'-dimethylsilylene)(2,2'-isopropylidene)-(3-tert-butylindenyl)

(3'-tert-butylindenyl)zirconium dichloride, (1,1'-dimethylsilylene)(2,2'-isopropylidene)-(3-trimethylsilylindenyl)(3'-trimethylsilylindenyl)zirconium dichloride, (1,1'-dimethylsilylene)(2,2'-isopropylidene)-(3-benzylindenyl)(3'-benzylindenyl)zirconium dichloride, (1,1'-dimethylsilylene)(2,2'-ethylene)-(indenyl)(cyclopentadienyl)zirconium dichloride, (1,1'-dimethylsilylene)(2,2'-isopropylidene)(indenyl)(cyclopentadienyl)zirconium dichloride, (3,3'-isopropylidene)(4,4'-isopropylidene)-(1-phosphacyclopentadienyl)(1'-phosphacyclopentadienyl)zirconium dichloride, (3,1'-isopropylidene)(4,2'-isopropylidene)-(1-phosphacyclopentadienyl)(4'-cyclopentadienyl)zirconium dichloride, and these compounds in which zirconium is replaced with titanium or hafnium. Needless to say, they are not restrictive. In addition, similar compounds containing metallic elements in other groups and a lanthanoide series of the periodic table are also usable.

These transition metal compounds of the component (A) may be used singly or in a combination of two or more thereof.

On the other hand, examples of a compound which can be used as the component (B) in the polymerization catalyst and which is capable of forming an ionic complex from the transition metal compound of the component (A) or its derivative include (B-1) an ionic compound for reacting with the transition metal compound of the component (A) to form an ionic complex, (B-2) an aluminoxane, and (B-3) a Lewis acid.

As the ionic compound of the component (B-1), any ionic compound can be used, so far as it reacts with the transition metal compound of the component (A) to form the ionic complex. However, there can be suitably used a compound comprising a cation and an anion in which a plurality of groups are bonded to an element, particularly a coordinate complex compound comprising a cation and an anion in which a plurality of groups are bonded to an element. The compound comprising a cation and an anion in which a plurality of groups are bonded to an element is a compound represented by the general formula

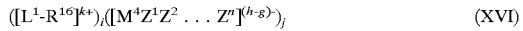

(XVI)

or

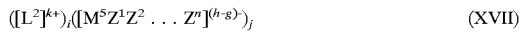

(XVII)

wherein $L^2$ is $M^6$, $R^{17}R^{18}M^7$, $R^{19}{}_3C$ or $R^{20}M^7$.

[in the formulae (XVI) and (XVII), $L^1$ is a Lewis base; $M^4$ and $M^5$ are each an element selected from the groups 5, 6, 7, 8–10, 11, 12, 13, 14 and 15 of the periodic table, preferably an element selected from the groups 13, 14 and 15; $M^6$ and $M^7$ are each an element selected from the groups 3, 4, 5, 6, 7, 8–10, 1, 11, 2, 12 and 17 of the periodic table; $Z^1$ to $Z^n$ are each a hydrogen atom, a dialkylamino group, an alkoxy group having 1 to 20 carbon atoms, an aryloxy group having 6 to 20 carbon atoms, an alkyl group having 1 to 20 carbon atoms, an aryl group, an alkylaryl group or an arylalkyl. group having 6 to 20 carbon atoms, a halogen-substituted hydrocarbon having 1 to 20 carbon atoms, an acyloxy group having 1 to 20 carbon atoms, an organic metalloid group or a halogen atom, and $Z^1$ to $Z^n$ may bond to each other to form a ring. $R^{16}$ is a hydrogen atom, an alkyl group having 1 to 20 carbon atoms, or an aryl group, an alkylaryl group or an arylalkyl group having 6 to 20 carbon atoms; $R^{17}$ and $R^{18}$ are each a cyclopentadienyl group, a substituted cyclopentadienyl group, an indenyl group or a fluorenyl group; and $R^{19}$ is an alkyl group having 1 to 20 carbon atoms, an aryl group, an alkylaryl group or an arylalkyl group. $R^{20}$ is a large cyclic ligand such as tetraphenylporphyrin or phthalocyanine. g is a valence of each of $M^4$ and $M^5$, and it is an integer of 1 to 7; h is an integer of 2 to 8; k is an ion valence of $[L^1-R^{16}]$ or $[L^2]$ and it is an integer of 1 to 7; and p is an integer of 1 or more, and j=(i×k)/(h−g).

Here, typical examples of the Lewis base represented by the $L^1$ include ammonia, amines such as methylamine, aniline, dimethylamine, diethylamine, N-methylaniline, diphenylamine, trimethylamine, triethylamine, tri-n-butylamine, N,N-dimethylaniline, methyldiphenylamine, pyridine, p-bromo-N,N-dimethylaniline and p-nitro-N,N-dimethylaniline, phosphines such as triethylphosphine, triphenylphosphine and diphenylphosphine, ethers such as dimethyl ether, diethyl ether, tetrahydrofuran and dioxane, thioethers such as diethyl thioether and tetrahydrothiophene, and an ester such as ethyl benzoate.

Furthermore, typical examples of $M^4$ and $M^5$ include B, Al, Si, P, As and Sb, and B and P are preferable. Typical examples of $M^6$ include Li, Na, Ag, Cu, Br and I, and typical examples of $M^7$ include Mn, Fe, Co, Ni and Zn. Typical examples of $Z^1$ to $Z^n$ include a dimethylamino group and a diethylamino group as the dialkylamino group; a methoxy group, an ethoxy group and an n-butoxy group as the alkoxy group having 1 to 20 carbon atoms; a phenoxy group, a 2,6-dimethylphenoxy group and a naphthyloxy group as the aryloxy group having 6 to 20 carbon atoms; a methyl group, an ethyl group, an n-propyl group, an isopropyl group, an n-butyl group, an n-octyl group and a 2-ethylhexyl group as the alkyl groups having 1 to 20 carbon atoms; a phenyl group, a p-tolyl group, a benzyl group, a 4-t-butylphenyl. group, a 2,6-dimethylphenyl group, a 3,5-dimethylphenyl group, a 2,4-dimethylphenyl group and a 2,3-dimethylphenyl group as the aryl groups, alkylaryl groups or arylalkyl groups having 6 to 20 carbon atoms; a p-fluorophenyl group, a 3,5-difluorophenyl group, a pentachlorophenyl group, a 3,4,5-trifluorophenyl group, a pentafluorophenyl group and a 3,5-di(trifluoromethyl)phenyl group as the halogen-substituted hydrocarbons having 1 to 20 carbon atoms; F, Cl, Br and I as the halogen atoms; and a pentamethylantimony group, a trimethylsilyl group, a trimethylgermil group, a diphenylarsine group, a dicyclohexylantimony group and a diphenylboron group as the organic metalloid groups. Typical examples of $R^{16}$, $R^{19}$ are as mentioned above. Typical examples of the substituted cyclopentadienyl group of $R^{17}$ and $R^{18}$ include alkyl group-substituted groups such as a methylcyclopentadienyl group, a butylcyclopentadienyl group and a pentamethylcyclopentadienyl group. Here, the alkyl group usually has 1 to 6 carbon atoms, and the number o:f the substituted alkyl groups is an integer of 1 to 5.

Among the compounds represented by the general formulae (XVI) and (XVII), the compounds in which $M^4$ and $M^5$ are boron are preferable.

Examples of the compound of the general formula (XVI) include triethylammonium tetraphenylborate, tri(n-butyl)ammonium tetraphenylborate, trimethylammonium tetraphenylborate, tetraethylammonium tetraphenylborate, methyl-tri(n-butyl)ammonium tetraphenylborate, benzyltri(n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzylmethylsulfonium tetraphenylborate, triethylammonium tetrakis(pentafluorophenyl)borate, tri(n-butyl) ammonium tetrakis(pentafluorophenyl)borate, triphenylammonium tetrakis(pentafluorophenyl)borate, tetrabutylammonium tetrakis(pentafluorophenyl)borate, tetraethylammonium tetrakis(pentafluorophenyl)borate, [methyltri(n-butyl)ammonium] tetrakis(pentafluorophenyl) borate, [benzyltri(n-butyl)ammonium] tetrakis (pentafluorophenyl)borate, methyldiphenylammonium tetrakis(pentafluorophenyl)borate, methyltriphenylammonium tetrakis(pentafluorophenyl)borate, dimethyldiphenyl-lammonium tetrakis(pentafluorophenyl)borate, anilinium tetrakis(pentafluorophenyl)borate, methylanilinium tetrakis (pentafluorophenyl)borate, dimethylanilinium tetrakis (pentafluorophenyl)borate, trimethylanilinium tetrakis (pentafluorophenyl)borate, dimethyl(m-nitroanilinium) tetrakis(pentafluorophenyl)borate, dimethyl(p-bromoanilinium)tetrakis(pentafluorophenyl)borate, pyridinium tetrakis(pentafluorophenyl)borate, (4-cyanopyridinium) tetrakis(pentafluorophenyl)borate, (N-methylpyridinium) tetrakis(pentafluorophenyl)borate, (N-benzylpyridinium) tetrakis(pentafluorophenyl)borate, (2-cyano-N-methylpyridinium) tetrakis(pentafluorophenyl) borate, (4-cyano-N-methylpyridinium, tetrakis (pentafluorophenyl)borate, (4-cyano-N-benzylpyridinium) tetrakis(pentafluorophenyl)borate, trimethylsulfonium tetrakis(pentafluorophenyl)borate, benzyldimethylsulfonium tetrakis(pentafluorophenyl)borate, tetraphenylphosphonium tetrakis(pentafluorophenyl)borate, dimethylanilinium tetrakis(3,5-ditrifluoromethylphenyl)borate, dimethylanilinium tris(pentafluorophenyl)(p-trifluoromethyltetrafluorophenyl)borate, triethylammonium tris(pentafluorophenyl)(p-trifluoromethyltetrafluorophenyl) borate, pyridinium tris(pentafluorophenyl)(p-trifluoromethyltetrafluorophenyl)borate, (N-methylpyridinium) tris(pentafluorophenyl)(p-trifluoromethyltetrafluorophenyl)borate, (2-cyano-N-methylpyridinium) tris(pentafluorophenyl)(p-trifluoromethyltetrafluorophenyl)borate, (4-cyano-N-benzylpyridinium) tris(pentafluorophenyl)(p-trifluoromethyltetrafluorophenyl)borate, triphenylphosphonium tris(pentafluorophenyl)(p-trifluoromethyltetrafluorophenyl)borate, dimethylanilinium tris(pentafluorophenyl)(2,3,5,6-tetrafluoropyridinyl)borate, triethylammonium tris(pentafluorophenyl)(2,3,5,6-tetrafluoropyridinyl)borate, pyridinium tris (pentafluorophenyl)(2,3,5,6-tetrafluoropyridinyl)borate, (N-methylpyridinium) tris(pentafluorophenyl)(2,3,5,6-tetrafluoropyridinyl)borate, (2-cyano-N-methylpyridinium) tris(pentafluorophenyl)(2,3,5,6-tetrafluoropyridinyl)borate, (4-cyano-N-benzylpyridinium) tris(pentafluorophenyl)(2,3, 5,6-tetrafluoropyridinyl)borate, triphenylphosphonium tris (pentafluorophenyl)(2,3,5,6-tetrafluoropyridinyl)borate, dimethylanilinium tris(pentafluorophenyl)(phenyl)borate, dimethylanilinium tris(pentafluorophenyl)[3,5-di (trifluoromethyl)phenyl]borate, dimethylanilinium tris (pentafluorophenyl)(4-trifluoromethylphenyl)borate, dimethylanilinium triphenyl(pentafluorophenyl)borate and triethylammonium hexafluoroarsenate.

On the other hand, examples of the compound of the general formula (XVII) include ferrocenium tetraphenylborate, silver tetraphenylborate, trityl tetraphenylborate, tetraphenylporphyrinmanganese tetraphenylborate, ferrocenium tetrakis(pentafluorophenyl) borate, (1,1'-dimethylferrocenium) tetrakis (pentafluorophenyl)borate, decamethylferrocenium tetrakis (pentafluorophenyl)borate, acetylferrocenium tetrakis (pentafluorophenyl)borate, formylferrocenium tetrakis (pentafluorophenyl)borate, cyanoferrocenium tetrakis (pentafluorophenyl)borate, silver tetrakis (pentafluorophenyl)borate, trityl tetrakis(pentafluorophenyl) borate, lithium tetrakis(pentafluorophenyl)borate, sodium tetrakis(pentafluorophenyl)borate, tetraphenylporphyrin-manganese tetrakis(pentafluorophenyl)borate, tetraphenylporphyriniron chloride tetrakis(pentafluorophenyl) borate, tetraphenylporphyrinzinc tetrakis (pentafluorophenyl)borate, silver tetrafluoroborate, silver hexafluoroarsenate and silver hexafluoroantimonate.

The ionic compounds, which are the components (B-1), capable of reacting with the transition metal compound of the above-mentioned component (A) to form an ionic complex may be used singly or in a combination of two or more thereof. Furthermore, a component comprising the transition metal compound of the component (A) and the ionic compound, which is the component (B-1), capable of forming an ionic complex may be a polycationic complex.

On the other hand, as the aluminoxane of the component (B-2), there can be mentioned a chain aluminoxane represented by the general formula (XVIII)

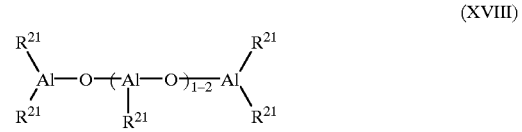

(XVIII)

(wherein $R^{21}$s are each independently a hydrocarbon group such as an alkyl group, a cycloalkyl group, an alkenyl group, an aryl group or an arylalkyl group having 1 to 20 carbon atoms, preferably 1 to 12 carbon atoms, or a halogen atom, more preferably the alkyl group; and f denotes a polymerization degree, and it is an integer of usually 2 to 50, preferably 2 to 40), and a cyclic aluminoxane represented by the general formula (XIX)

(XIX)

(wherein $R^{21}$s are as defined above; and f is usually an integer of 3 to 50, preferably 3 to 40).

Furthermore, modified aluminoxanes can also suitably be used which can be obtained by modifying the aluminoxanes represented by the general formulae (XVIII) and (XIX) with a compound such as water having an active hydrogen and which are insoluble in usual solvents.

As a preparation method of the above-mentioned aluminoxanes, a method can be mentioned in which an alkylaluminum is brought into contact with a condensation agent such as water, but no particular restriction is put on its means, and the reaction can be carried out in a known manner. For example, there are (1) a method which comprises dissolving an organic aluminum compound in an organic solvent, and then bringing the solution into contact with water, (2) a method which comprises first adding an organic aluminum compound at the time of polymerization, and then adding water, (3) a method which comprises reacting water of crystallization contained in a metallic salt or water adsorbed by an inorganic substance or an organic substance with an organic aluminum compound, and (4) a method which comprises reacting a tetraalkyldialuminoxane with a trialkylaluminum, and further reacting with water.

These aluminoxanes may be used singly or in a combination of two or more thereof.

Furthermore, no particular restriction is put on the Lewis acid which is the (B-3) component, and this Lewis acid may be an organic compound or a solid inorganic compound. As the organic compound, boron compounds and aluminum compounds are preferably used, and as the inorganic compound, magnesium compounds and aluminum compounds are preferably used. Examples of the organic aluminum compounds include bis(2,6-di-t-butyl-4-methylphenoxy)aluminum methyl and (1,1-bi-2-naphthoxy) aluminum methyl, examples of the magnesium compounds include magnesium chloride and diethoxymagnesium, examples of the aluminum compounds include aluminum oxide and aluminum chloride, and examples of the boron compounds include triphenylboron, tris(pentafluorophenyl) boron, tris[3,5-bis(trifluoromethyl)phenyl]boron, tris[(4-fluoromethyl)phenyl]boron, trimethylboron, triethylboron, tri-n-butylboron, tris(fluoromethyl)boron, tris (pentafluoroethyl)boron, tris(nonafluorobutyl)boron, tris(2, 4,6-trifluorophenyl)boron, tris(3,5-difluoro)boron, tris[3,5-bis(trifluoromethyl)phenyl]boron, bis(pentafluorophenyl) fluoroboron, diphenylfluoroboron, bis(pentafluorophenyl) chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron and n-butyldifluoroboron. These Lewis acids may be used singly or in a combination of two or more thereof.

In the present invention, the above-mentioned components (B-1), (B-2) and (B-3) may be used singly or in a combination of two or more thereof as the catalytic component (B).

In the polymerization catalyst which can be used in the present invention, if necessary, as the component (C), there can be used an organic aluminum compound represented by the general formula (XX)

$$R^{22}{}_m AlQ_{3-m} \quad (XX)$$

(wherein $R^{22}$ represents an alkyl group having 1 to 10 carbon atoms; Q is a hydrogen atom, an alkoxy group having 1 to 20 carbon atoms, an aryl group having 6 to 20 carbon atoms or a halogen atom, and m is an integer of 1 to 3).

In particular, when as the component (B), the ionic compound represented by the component (B-1), capable of reacting with the transition metal compound of the component (A) to form an ionic complex, is used together with the organic aluminum compound (C), a high activity can be obtained.

Typical examples of the compound represented by the general formula (XX) include trimethylaluminum, triethylaluminum triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

These organic aluminum compounds may be used singly or in a combination of two or more thereof.

Next, in the present invention, at least one of the catalyst components (A), (B) and, if desired, (C) can be supported on a suitable carrier and then used.

No particular restriction is put on the kind of carrier, and inorganic oxide carriers, other inorganic carriers and organic carriers all can be used, but the inorganic oxide carriers and the other inorganic carriers are particularly preferable.

Typical examples of the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica-alumina, zeolite, ferrite, sepiolite and glass fiber. Above all, $SiO_2$ and $Al_2O_3$ are particularly preferable. In this connection, the above-mentioned inorganic oxide carrier may contain a small amount of a carbonate, a nitrate, a sulfate or the like.

On the other hand, examples of the inorganic carriers other than mentioned above include magnesium compounds such as $MgCl_2$ and $Mg(OC_2H_5)_2$ and their complex salts as well as organic magnesium compounds represented by the general formula $MgR^{23}X^3Y$. Here, $R^{23}$ represents an alkyl group having 1 to 20 carbon atoms, an alkoxy group having 1 to 20 carbon atoms or an aryl group having 6 to 20 carbon atoms; $X^3$ is a halogen atom or an alkyl group having 1 to 20 carbon atoms; x is 0 to 2; and y is 0 to 2.

Furthermore, examples of the organic carriers include polymers such as polystyrenes, styrene-divinylbenzene copolymers, substituted polystyrenes, polyethylenes, polypropylenes and polyarylates, starch and carbon.

The state of the carrier which can be used herein depends upon its kind and a manufacturing process, but its average particle diameter is usually in the range of 1 to 300 μm, preferably 10 to 200 μm, more preferably 20 to 100 μm.

If the particle diameter is small, the fine powder of the polymer increases, and if the particle diameter is large, the coarse particles of the polymer increase, which causes the deterioration of a bulk density and the clogging of a hopper.

Moreover, the specific surface area of the carrier is usually in the range of 1 to 1000 m$^2$/g, preferably 50 to 500 m$^2$/g, and its pore volume is usually in the range of 0.1 to 5 cm$^3$/g, preferably 0.3 to 3 cm$^3$/g.

If either of the specific surface area and the pore volume deviates from the above-mentioned range, a catalyst activity deteriorates sometimes. In this connection, the specific surface area and the pore volume can be calculated from the volume of an adsorbed nitrogen gas in accordance with a BET method (refer to Journal of the American Chemical Society, Vol. 60, p. 309 (1983)].

Furthermore, it is desirable that the above-mentioned carrier, when used, is calcined usually at 150 to 1000° C., preferably 200 to 800° C.

No particular restriction is put on a method for supporting the catalytic components on the carrier, and a conventional usual method can be used.

Next, a ratio between the respective catalytic components which can be used in the present invention will be described. In the case (1) that the catalytic components (A) and (B-1) are used, both the components are suitably used so that a molar ratio of the component (A)/the component (B-1) may be in the range of 1/0.1 to 1/100, preferably 1/0.5 to 1/10, more preferably 1/1 to 1/5. In the case (2) that the catalytic components (A), (B-1) and (C) are used, a molar ratio of the component (A)/the component (B-1) is the same as in the above-mentioned case (1), but a molar ratio of the component (A)/the component (C) is in the range of 1/2,000 to 1/1, preferably 1/1,000 to 1/5, more preferably 1/500 to 1/10.

Furthermore, in the case (3) that the catalytic components (A) and (B-2) are used, both the components are suitably used so that a molar ratio of the component (A)/the component (B-2) may be in the range of 1/10 to 1/10,000, preferably 1/20 to 1/5,000, more preferably 1/30 to 1/2,000.

In the case (4) that the catalytic components (A), (B-2) and (C) are used, a molar ratio of the component (A)/the component (B-2) is the same as in the above-mentioned case (3), but a molar ratio of the component (A)/the component (C) is in the range of 1/2,000 to 1/1, preferably 1/1,000 to 1/2, more preferably 1/500 to 1/5.

In addition, in the case (5) that the catalytic components (A) and (B-3) are used, both the components are suitably used so that a molar ratio of the component (A)/the component (B-3) may be in the range of 1/0.1 to 1/2,000, preferably 1/0.2 to 1/1,000, more preferably 1/0.5 to 1/500. In the case (6) that the catalytic components (A), (B-3) and (C) are used, a molar ratio of the component (A)/the component (B-3) is the same as in the above-mentioned case (5), but a molar ratio of the component (A)/the component (C) is in the range of 1/2,000 to 1/1, preferably 1/1,000 to 1/5, more preferably 1/500 to 1/10.

No particular restriction is put on a polymerization method for obtaining the branched ethylenic macromonomer and the copolymer of the present invention, and examples of the utilizable polymerization method include a solvent polymerization method (suspension polymerization and solution polymerization) using an inactive hydrocarbon or the like, a bulk polymerization method in which the polymerization is carried out under substantially inactive hydrocarbon-free conditions, and a gaseous phase polymerization.

Examples of the hydrocarbon solvent which can be used in the polymerization include saturated hydrocarbons such as butane, pentane, hexane, heptane, octane, nonane, decane, cyclopentane and cyclohexane, aromatic hydrocarbons such as benzene, toluene and xylene, and chlorine-containing solvents such as chloroform, dichloromethane, ethylene dichloride and chlorobenzene.

Polymerization temperature is usually in the range of −100 to 200° C., preferably −50 to 100° C., more preferably 0 to 100° C., and polymerization pressure is usually in the range of atmospheric pressure to 100 kg/cm²G, preferably atmospheric pressure to 50 kg/cm²G, more preferably atmospheric pressure to 20 kg/cm²G.

When the branched ethylenic macromonomer is prepared, the control of a molecular weight can be carried out by a usual manner of lowering the molecular weight, for example, a manner of raising the temperature, a manner of decreasing the amount of the monomer to be fed, a manner of increasing the amount of the catalyst, or the like. Furthermore, when the copolymer is prepared, the control of the molecular weight of the obtained polymer is carried out by a usual means, for example, (1) hydrogen, (2) temperature, (3) a monomer concentration or (4) a catalyst concentration.

Furthermore, the present invention is also directed to a substantially unsaturated group-free branched ethylenic polymer obtained by hydrogenating the branched ethylenic macromonomer. No particular restriction is put on this hydrogenation method, and the macromonomer is hydrogenated in the presence of a known hydrogenation catalyst to obtain the desired substantially unsaturated group-free branched ethylenic polymer. This hydrogenated branched ethylenic polymer is useful as a wax in various uses such as a base oil for a lubricating oil and an additive having a controlled viscosity index.

No particular restriction is put on the kind of hydrogenation catalyst which can be used herein, and there can be employed the catalysts previously mentioned in detail and catalysts which can usually be used at the time of the hydrogenation of an olefin compound. For example, the following catalysts can be mentioned.

Examples of a heterogeneous catalyst include nickel, palladium and platinum as well as solid catalysts obtained by supporting these metals onto carriers such as carbon, silica, diatomaceous earth, alumina and titanium oxide, for example, nickel-silica, nickel-diatomaceous earth, palladium-carbon, palladium-silica, palladium-diatomaceous earth and palladium-alumina. Examples of the nickel catalyst include Raney nickel catalysts, and examples of the platinum catalyst include a platinum oxide catalyst and platinum black. Examples of a homogeneous catalyst include catalysts containing metals in the groups 8 to 10 of the periodic table as basic components, for example, catalysts comprising Ni and Co compounds and organic metallic compounds of metals selected from the groups 1, 2 and 3 of the periodic table such as cobalt naphthenate-triethylaluminum, cobalt octenoate-n-butyl-lithium, nickel acetylacetonato-triethylaluminum, and Rh compounds.

In addition, Ziegler hydrogenation catalysts disclosed by M. S. Saloan et al. [J. Am. Chem. Soc., 85, p. 4014 (1983)] can also effectively used. Examples of the:se catalysts include the following compounds.

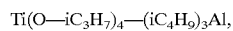

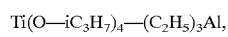

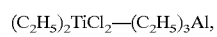

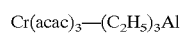

(wherein acac represents acetylacetonato),

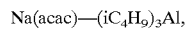

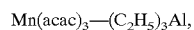

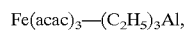

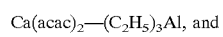

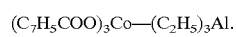

The amount of the catalyst to be used in the hydrogenation step is suitably selected so that a molar ratio of the remaining unsaturated groups to the hydrogenation catalyst components in the macromonomer may be in the range of 107:1 to 10:1, preferably 106:1 to 102:1.

Furthermore, the charge pressure of hydrogen is suitably in the range of from atmospheric pressure to 50 kg/cm²G. Besides, a reaction temperature is preferably on a higher side in the range in which the macromonomer do not decompose, and it is usually selected in the range of −100 to 300° C., preferably −50 to 200° C., more preferably 10 to 180° C.

Next, the present invention will be described in more detail with reference to examples, but the scope of the present invention should not be limited to these examples.

EXAMPLE 1

(1) Preparation of methylaluminoxane

In a 500-ml glass container which had been purged with argon were placed 200 ml of toluene, 17.8 g (71 mmol) of copper sulfate pentahydrate (CUSO₄.5H₂O) and 24 ml (250 mmol) of trimethylaluminum, and the mixture was then reacted at 40° C. for 8 hours. Afterward, solid components were removed from the reaction mixture to obtain a toluene solution containing methylaluminoxane.

(2) Preparation of macromonomer

A 2-liter three-necked flask was purged with ethylene, and in this flask were placed 1,000 ml of toluene, 4 mmol of triisobutylaluminum (TIBA), 80 mmol of methylaluminoxane prepared in the above-mentioned (1) in terms of an aluminum atom and 0.3 mmol of pentamethylcyclopentadienyltitanium trimethoxide, and ethylene was continuously fed at 40° C. under atmospheric pressure to carry out polymerization for 10 hours. After the completion of the polymerization, a small amount of methanol was poured thereinto, and demineralization was then done with an aqueous hydrochloric acid/toluene system, followed by fractionation. The resulting toluene layer was dried over anhydrous sodium sulfate, and toluene was then distilled off to obtain 3.5 g of a waxy product.

(3) Evaluation of macromonomer (1) Results of $^1$H-NMR measurement (CDCl$_3$, 50° C.)

A molar ratio of a terminal methyl group/a vinyl group was 8/1, and the content of the vinyl group was 90 mol % with respect to the total unsaturated groups.

(2) Results of $^{13}$C-NMR measurement (CDCl$_3$, 50° C.)

As the peaks of a methyl group, there were an ethyl branch at 10.5 to 11.0 ppm, a butyl or more branch at 13.5 to 14.0 ppm and a methyl branch at 19.0 to 20.0 ppm, and with regard to a peak intensity ratio, the methyl branch:the ethyl branch:the butyl or more branch was 2:1:4.

Furthermore, from the peak intensity of a methylene group adjacent to the methyl group, it was apparent that the butyl branch:a hexyl or more branch (molar ratio) was 1:3, whereby it was confirmed that the product was a macromonomer having a structure in which the methyl branch::the ethyl branch:the butyl branch:the hexyl or more branch (molar ratio) was 2:1:1:3.

(3) Measurement of weight-average molecular weight

The molecular weight of the macromonomer was measured in terms of the polyethylene under conditions of device: Waters ALC/GPC 150C, column: made by Toso Co., Ltd., TSK HM+GMH6×2, solvent: 1,2,4-trichlorobenzene, temperature: 135° C., flow rate: 1 ml/min by a gel permeation chromatography (GPC) method. As a result, the weight-average molecular weight (Mw) of the macromonomer was 3,300.

EXAMPLE 2

Under a nitrogen atmosphere, 0.2 g of the branched macromonomer obtained in Example 1-(2) was dissolved in 50 ml of toluene. Next, 0.5 mmol of triisobutylaluminum was added to the solution, and nitrogen was then exchanged for ethylene and it was fed under atmospheric pressure while the solution was stirred.

Furthermore, 20 micromol of anilinium tetrakis (pentafluorophenyl)borate and 10 micromol of (tert-butylamido)dimethyl(tetramethyl-η$^5$-cyclopentadienyl) silanetitanium dichloride were added thereto, and polymerization was then carried out at 90° C. for 30 minutes under atmospheric pressure while ethylene was allowed to flow. Next, in order to remove the unreacted macromonomer, the reaction solution was sufficiently washed at room temperature with toluene to obtain 3.7 g of an ethylenic copolymer.

The intrinsic viscosity of this copolymer measured in decalin at a temperature of 135° C. was in the range of 2.6 dl/g, and in the $^{13}$C-NMR of the copolymer, there were observed absorptions attributed to an ethyl branch at 10.5 ppm, a butyl or more branch at 13.5 ppm and a methyl branch at 19.5 ppm which were confirmed in the macromonomer.

Furthermore, a CH$_3$/CH$_2$ molar ratio calculated from $^1$H-NMR was 1/186.

EXAMPLE 3

The macromonomer obtained in Example 1-(2) was hydrogenated in a decalin solution under conditions of a temperature of 140° C., a reaction time of 6 hours, a macromonomer concentration of 0.1% by weight, a hydrogen partial pressure of 30 kg/cm$^2$G and a ruthenium-supporting carbon carrier catalyst (Ru content=5% by weight) concentration of 4% by weight, and the resulting polymer was then isolated from a reaction solution.

According to the results of $^1$H-NMR analysis of this polymer, any absorption of an unsaturated group was not observed.

EXAMPLE 4

In a 1.4-liter autoclave equipped with a stirrer were placed 500 ml of dehydrated toluene, and 4 mmol (as an aluminum atom) of the methylaluminoxane prepared in Example 1-(1) and 1 g of the macromonomer obtained in Example 1-(2) were then added thereto. After stirring and dissolving, 0.01 mmol of (2,2 -dimethylsilylene)-bis(indenyl)zirconium dichloride was added, and the solution was heated up to 50° C. Next, propylene was introduced into the autoclave, and polymerization was carried out for 1 hour while the state of 6.0 kg/cm$^2$G was maintained. After the completion of the polymerization, the gaseous phase was purged, and the slurry portion was collected by filtration and then dried to obtain 35 g of a powdery propylene copolymer.

The intrinsic viscosity of this copolymer measured in decalin at 135° C. was 0.8 dl/g, and in the $^{13}$C-NMR measurement of the copolymer, there were observed absorptions attributed to an ethyl branch at 10.5 ppm and a butyl or more branch at 13.5 ppm which were confirmed in the macromonomer. Furthermore, the content of the macromonomer segment calculated from $^1$H-NMR was 0.2% by weight. In addition, the melting point of the copolymer measured by a DSC (a differential scanning calorimeter) was 142.5° C., and the weight-average molecular weight (Mw)/ the number-average molecular weight (Mn) of the copolymer was 2.6.

EXAMPLE 5

(1) Preparation of methylaluminoxane

Toluene was distilled off from the toluene solution of the methylaluminoxane prepared in Example 1-(1), and the resulting solid component was then treated at 130° C. under a reduced pressure of 3×10$^{-3}$ Torr for 5 hours. This solid component was dissolved in toluene again to prepare the toluene solution of methylaluminoxane.

(2) Preparation of styrene-macromonomer copolymer

In a 1.4-liter autoclave equipped with a stirrer were placed 500 ml of dehydrated toluene. Furthermore, 5 mmol (as an aluminum atom) of the methylaluminoxane prepared in the above-mentioned (1), 1 g of the macromonomer obtained in Example 1-(2), 0.03 mmol of pentamethylcyclopentadienyltitanium tributoxide and 200 ml of styrene were then added thereto, and copolymerization was carried out at 80° C. under 6.0 kg/cm$^2$G for 2 hours. After the completion of the polymerization, the reaction mixture was poured into a large amount of methanol, and the solid portion was collected by filtration and then dried to obtain 30 g of a copolymer.

The intrinsic viscosity of this copolymer measured in decalin at 135° C. was 0.8 dl/g, and in the $^{13}$C-NMR measurement of the copolymer, there were observed absorptions attributed to an ethyl branch at 10.5 ppm and a butyl or more branch at 13.5 ppm which were confirmed in the macromonomer. Furthermore, the content of the macromonomer segment calculated from $^1$H-NMR was 0.1% by weight. In addition, the melting point of the copolymer measured by a DSC was 265° C., and the weight-average molecular weight (Mw)/the number-average molecular weight (Mn) of the copolymer was 2.2.

EXAMPLE 6

Preparation of (1,1'-dimethylsilylene)(2,2'-isopropylidene)-(indenyl)zirconium dichloride (1) In a 1-liter three-necked flask purged with nitrogen were placed 10.8 g of magnesium and 45 ml of THF, and 0.6 ml of dibromomethane was added dropwise thereto. After stirring for 5 minutes, the solvent was distilled off under reduced pressure, and 200 ml of THF was then newly added. Next, 18.3 g (0.105 mol) of α,α'-dichloro-o-xylene was dissolved in 300 ml of THF, and the solution was then added dropwise to the autoclave at room temperature over 3 hours. After the completion of the dropping, the solution was further stirred for 15 hours and cooled to −78° C., and a THF (100 ml) solution containing 6.8 g (36.2 mmol) of diethyl dimethylmalonate was added dropwise over 1 hour. Afterward, the temperature of the solution was returned to room temperature, and after stirring for 2 hours, 100 ml of water was added thereto at room temperature. The mixture was filtered with suction, and the solvent was then distilled off under reduced pressure. Next, extraction was carried out by the use of dichloromethane and a 1N aqueous ammonium chloride solution, and the resulting organic layer was washed twice with water, and then dried over magnesium sulfate. The solid was removed by filtration, and the solvent was then distilled off to obtain a yellow oil. In addition, the oil was purified through a column chromatograph using active alumina, and then recrystallized from hexane to obtain 4.8 g of (15.9 mmol, yield=44%) the desired compound (the following compound a) in the state of a colorless crystal.

The $^1$H-NMR of the obtained compound was measured, and the following results were obtained.

$^1$H-NMR (CDCl$_3$, δ): 1.235 (s, 6H, CH$_3$), 3.002 (d, J=16.4 Hz) and 3.470 (d, J=16.4 Hz) (8H, CH$_2$), 3.767 (s, 2H, OH), 7.2–7.4 (mul, 8H, PhH)

Compound a

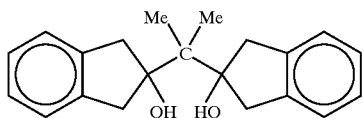

wherein Me is a methyl group, and the same shall apply hereinafter.

(2) 4.8 g (15.9 mol) of the compound a obtained in the above-mentioned (1) was dissolved in 30 ml of dichloromethane, and 3.04 g (15.9 mmol) of p-toluenesulfonic acid was added, followed by reflux for 8 hours. The reaction mixture was washed with an aqueous sodium hydrogen-carbonate solution and water, and then dried over magnesium sulfate. The resulting precipitate was removed by filtration, and the solvent was then distilled off to obtain a yellow oil. This oil was purified through a column chromatograph using silica gel, and then recrystallized from hexane to obtain 2.3 g (8.6 mmol, yield=54%) of the desired compound (the following compound b) in the state of a colorless crystal.

The $^1$H-NMR of the obtained compound was measured, and the following results were obtained.

$^1$H-NMR (CDCl$_3$, δ): 1.586 (s, 6H, CH$_3$), 3.470 (s, 4H, CH$_2$), 3.767 (s, 2H, CpH) 6.9–7.5 (mul, 8H, PhH)

Compound b

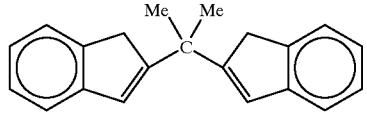

(3) In a Schlenk tube purged with nitrogen were placed 6.2 g (22.7 mmol) of the Compound b obtained by repeating the reactions of the above-mentioned (1) and (2) and 50 ml of diethyl ether. Next, the solution was cooled to −78° C., and 28.4 ml (45.4 mmol) of an n-butyllithium solution having a concentration of 1.6 mol/liter was added dropwise thereto. The temperature of the solution was returned to room temperature, and at this time, a white precipitate was gradually deposited. After stirring at room temperature for 3 hours, the supernatant liquid was drawn out, and the precipitate was washed twice with a small amount of diethyl ether. Next, the precipitate was dried under reduced pressure to obtain a dilithium salt (the following Compound c) in the state of a colorless powder:

Compound c

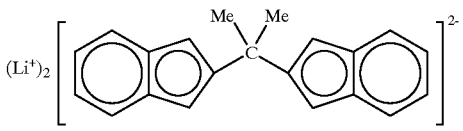

(4) The dilithium salt (Compound c) obtained above was dissolved in 100 ml of THF. Next, 3.0 g (22.7 mmol) of distilled dichlorodimethylsilane was slowly added dropwise at room temperature, followed by stirring for 3 hours. The solvent was distilled off, and extraction was then carried out with dichloromethane and water. The resultant organic layer was washed twice with water, and then dehydrated over magnesium sulfate. Afterward, the resulting precipitate was filtered, and recrystallization was then carried out from hexane to obtain 6.5 g (19.6 mmol, yield: 86.5%) of a colorless crystal (the following Compound d).

The $^1$H-NMR of this product was measured, and the following results were obtained.

$^1$H-NMR (CDCl$_3$, δ): −0.354 (s, 6H, SiCH$_3$), 1.608 (s, 6H, CCH$_3$), 3.347 (s, 2H, SiCH), 6.785 (s, 2H, CpH), 6.9–7.6 (mul, 8H, PhH)

Compound d

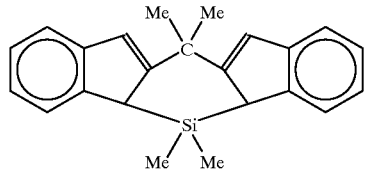

(5) In a Schlenk tube purged with nitrogen were placed 0.9 g (2.7 mmol) of the Compound d obtained in the above-mentioned (4) and 50 ml of hexane. Next, the solution was cooled to 0° C., and 3.4 ml (5.4 mmol) of an n-butyllithium solution having a concentration of 1.6 mol/ liter was added dropwise thereto. The temperature of the solution was returned to room temperature, and at this time, a white precipitate was deposited. After stirring at room temperature for 3 hours, the supernatant liquid was drawn out, and the precipitate was washed twice with hexane. Next, the precipitate was dried under reduced pressure to obtain a dilithium salt (the following Compound e) in the state of a pink powder:

Compound e

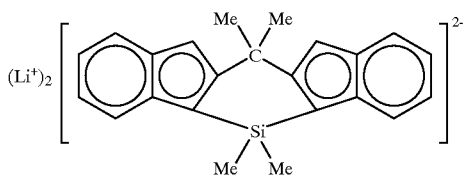

(6) Toluene was added to the dilithium salt (Compound e) obtained in the above-mentioned (5) to form a suspension. Next, to this suspension, a toluene suspension containing 630 mg (2.7 mmol) of tetrachlorozirconium was added dropwise at 0° C. The temperature of the mixture was returned to room temperature, and after stirring for 24 hours, a precipitate was removed by filtration and the solution was then concentrated. Afterward, recrystallization was done from toluene-hexane to obtain 240 mg (0.508 mmol, yield: 19%) in the state of a yellowish orange crystal.

The $^1$H-NMR of this product was measured, and the following results were obtained.

$^1$H-NMR (heavy THF, δ): −0.172 (s, 3H, SiCH$_3$), 0.749 (s, 3H, SiCH$_3$), 1.346 (s, 3H, CCH$_3$), 2.141 (s, 3H, CCH$_3$), 3.654 (, 2H, CpH), 6.692 (s, 2H, CpH), 6.9–8.1 (mul, 8H, PhH)

Zirconium complex

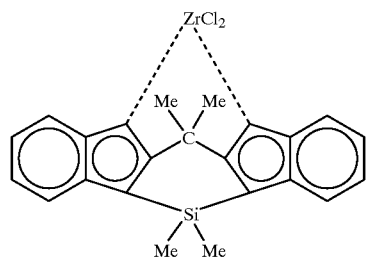

(7) Preparation of ethylenic macromonomer

In a 1-liter autoclave heated and dried under reduced pressure were placed 500 ml of hexane under an argon atmosphere, and its temperature was then raised up to 150° C. Next, argon was introduced thereinto until 11 kg/cm$^2$G had been reached, and ethylene was then introduced so as to attain a total pressure of 24 kg/cm$^2$G. Afterward, 20 ml of toluene, 10 mmol of the methylaluminoxane obtained in Example 1-(1), 0.5 mmol of triisobutylaluminum and 5 μm of a zirconium complex obtained in the above-mentioned (6) which had previously been prepared in a feed pipe were fed to the autoclave, and ethylene was then continuously introduced for 5 minutes so that a total pressure might be constant at 35 kg/cm$^2$G, whereby polymerization was carried out. As a result, 85 g of the macromonomer was obtained.

(8) Evaluation of ethylenic macromonomer (1) Results of $^1$H-NMR measurement

A molar ratio of a terminal methyl group/a vinyl group was 10/1, and the content of the vinyl group was 87 mol % with respect to the total unsaturated groups.

(2) Results of $^{13}$C-NMR measurement

As the peak of a methyl group, there was a butyl group or more branch at 13.5 to 14 ppm, and the peak of a methylene group adjacent to the methyl group was positioned at 22.8 to 23.0 ppm, whereby it was confirmed that the methylene group was a hexyl group or more branch.

(3) Measurement of weight-average molecular weight

The measurement was made as in Example 1-(3), and as a result, the weight-average molecular weight (Mw) of the macromonomer was 5000.

EXAMPLE 7

Preparation of ethylene/1-butene copolymeric macromonomer

The same procedure as in Example 6-(7) was carried out except that after the addition of the toluene, 20 g of 1-butene was poured, thereby preparing a copolymer. As a result, 35 g of the macromonomer was obtained. The evaluation of the macromonomer was carried out as follows.

(1) Results of $^1$H-NMR measurement

A molar ratio of a terminal methyl group/a vinyl group was 15/1, and the content of the vinyl group was 86 mol % with respect to the total unsaturated groups.

(2) Results of $^{13}$C-NMR measurement

As the peak of a methyl group, there was 13.5 to 14 ppm (a butyl group or more branch), and the peak of a methylene group adjacent to the methyl group was positioned at 22.8 to 23.0 ppm, whereby a hexyl group or more branch was confirmed.

In addition, as absorptions based on an ethyl branch introduced by the use of 1-butene, there were confirmed the methyl group at about 11.1 ppm and the methylene group at about 26.8 ppm.

(3) Measurement of weight-average molecular weight

The measurement was made as in Example 1-(3), and as a result, the weight-average molecular weight (Mw) of the macromonomer was 4500.

EXAMPLE 8

(1) Preparation of ethylene/1-butene/macromonomer ternary polymer

In a 1.4-liter autoclave equipped with a stirrer were placed 500 ml of dehydrated toluene. Furthermore, 4 Mmol (as an aluminum atom) of the methylaluminoxane prepared in the above-mentioned 5-(1), 5 g of the macromonomer obtained in Example 6 and 8 g of 1-butene were added thereto, followed by sufficient stirring to dissolve the macromonomer. Afterward, the solution was heated up to 65° C., and 0.01 mmol of pentamethylcyclopentadienyltitanium tributoxide was then added thereto. Immediately, hydrogen was introduced into the autoclave until a gauge pressure of 0.5 kg/cm$^2$ had been reached, and ethylene was then continuously fed under a gauge pressure of 4 kg/cm$^2$. After the completion of the polymerization, the pressure was released and the reaction mixture was poured into a large amount of methanol, and the solid portion was collected by filtration and then dried to obtain 48 g of a copolymer.

The intrinsic viscosity of this copolymer measured in decalin at 135° C. was 1.6 dl/g, and the content of a butene-1 unit was 6.2 mol %. In addition, as kinds of branches other than 1-butene, hexyl group or more branches were observed, so that it was elucidated that the macromonomer was copolymerized. The content of this macromonomer segment was 0.2% by weight. Furthermore, the weight-average molecular weight (Mw) of this copolymer was 86000.

(2) Measurement of die swell ratio of copolymer

A die swell ratio (DR) was measured under the following conditions, and it was 2.4.

In this case, the value of $[0.5+0.125 \times \log Mw]$ was 1.12.

<Die swell ratio ($D_R$)>

The die swell ratio (DR) was obtained as ($D_1/D_0$) by measuring a diameter ($D_1$, mm) of a strand formed by extrusion through a capillary nozzle [diameter ($D_0$)=1.275 mm, length (L)=51.03 mm, L/$D_0$=40, and entrance angle= 90°] at an extrusion speed of 1.5 mm/min (shear rate=10 sec$^{-1}$) at a temperature of 190° C. by the use of a capillograph made by Toyo Seiki Seisakusho Co., Ltd., and then dividing this diameter by the diameter of the capillary nozzle.

In this connection, the diameter ($D_1$) of the strand was an average value of values obtained by measuring long axes and short axes of central portions of 5 samples having a extruded strand length of 5 cm (a length of 5 cm from a nozzle outlet).

(3) Measurement of composition distribution of copolymer

A polymer solution of o-dichlorobenzene whose concentration had been adjusted to about 6 g/liter at 135° C. was poured, by a constant delivery pump, into a column having an inner diameter of 10 mm and a length of 250 mm which is filled with Chromosorb PNAN (80/100 mesh) as a column filler. The polymer solution was cooled to room temperature at a rate of 10° C./hr, so that the polymer was adsorbed and crystallized on the filler. Afterward, o-dichlorobenzene was fed at a feed rate of 2 cc/min under heat-up rate conditions of 20° C./hr. Then, the concentration of the eluted polymer was measured by an infrared detector (device: 1-A Fox Boro CVF Co., Ltd., cell: $CaF_2$), whereby the composition distribution curve to an elution temperature was obtained.

As a result, the elution temperature (T) of the peak top was 72.5° C., and a half value width (W) was 23.5° C.

In this connection, a value of $[-24.9+2470/T]$ was 9.2.

EXAMPLE 9

(1) Preparation of (1,1'-dimethylsilylene)(2,2'-isopropylidene)-bis(cyclopentadienyl)zirconium dichloride (A-1)

0.7 g (3.2 mmol) of (1,1'-dimethylsilylene)(2,2'-isopropylidene)-bis(cyclopentadiene) was dissolved in 30 ml of hexane, and 6.48 mmol of n-butyllithium (a hexane solution containing n-butyllithium of 1.5 mol per liter of hexane) was added dropwise at −78° C. to the solution, followed by stirring at room temperature for 5 hours. Next, the solvent was distilled off, and the resulting residue was washed with 20 ml of hexane, and the washed white solid was then dried under reduced pressure. Afterward, to the toluene suspension (20 ml) of this solid, 0.8 g (3.2 mmol) of zirconium tetrachloride was added, and after stirring for 12 hours at room temperature, the solvent was distilled off. Next, recrystallization was carried out from dichloromethane-hexane to obtain 0.3 g of (1,1'-dimethylsilylene)(2,2'-isopropylidene)-bis(cyclopentadienyl)zirconium dichloride in the state of a light yellow powder.

The $^1$H-NMR of this product was measured, and the following results were obtained.

$^1$H-NMR (90 MHz, CDCl$_3$, δ): 1.01 (3H, S, (CH$_3$)$_2$Si], 0.54 [3H, S, (CH$_3$)$_2$Si], 1.52 [3H, s, (CH$_3$)$_2$C], 2.16 [3H, s, (CH$_3$)$_2$C], 6.17 (2H, m, —CH—), 6.53 (2H, m, —CH—), 6.82 (2H, m, —CH—).

Incidentally, (1,1'-dimethylsilylene)(2,2'-isopropylidene)-bis(cyclopentadiene) was synthesized in accordance with a procedure described in "Organometallics", Vol. 10, p. 3739 (1991).

(2) Preparation of macromonomer

A 1-liter three-necked flask was purged with ethylene, and in this flask were placed 400 ml of toluene and 1 mmol of triisobutylaluminum (TIBA), followed by heating the solution up to 90° C. Next, ethylene was continuously fed to this solution under atmospheric pressure, and after a saturating state had been attained, 0.02 mmol of the zirconium complex prepared in the above-mentioned (1) and 0.02 mmol of N,N-dimethylammonium tetrakis(pentafluorophenyl)borate were added to the flask to carry out polymerization for 1 hour. After the completion of the polymerization, the reaction mixture was poured into methanol, washed, filtered, and then dried to obtain 43 g of the macromonomer.

(3) Evaluation of macromonomer

The same procedure as in Example 1-(3) was carried out, and as a result, a molar ratio of a terminal methyl group/a vinyl group was 8/1, and the content of the vinyl group was 72 mol % with respect to the total unsaturated groups. In addition, as kinds of branches, hexyl group or more branches were observed, and the weight-average molecular weight (Mw) of the macromonomer was 2,600.

Possibility of Industrial Utilization

A branched ethylenic macromonomer of the present invention can function as a comonomer to provide a copolymer having excellent molding and working properties and can be hydrogenated to provide a branched ethylenic polymer having a low molecular weight as a wax useful in various uses such as a base oil for a lubricating oil and an additive having a controlled viscosity index. Accordingly, the macromonomer can be considered to be an extremely useful compound.

What is claimed is:

1. A branched ethylenic macromonomer which is derived from ethylene or derived from ethylene and at least one comonomer selected from the group consisting of an α-olefin having 3 to 20 carbon atoms, acrylic olefin and styrenes, wherein (a) the molar ratio of a terminal methyl group to a vinyl group in the macromonomer is in the range of 1 to 100, the macromonomer having a branch other than the branch directly derived from the α-olefin, the cyclic olefin or the styrenes, (b) the ratio of vinyl groups to the total unsaturated groups in the macromonomer is 70 mol % or more, (c) the weight-average molecular weight (Mw) of the macromonomer measured by a gel permeation chromatography is in the range of 100 to 20,000.

2. A branched ethylenic polymer substantially in the absence of an unsaturated group which is obtained by hydrogenating the branched ethylenic macromonomer described in claim 1.

3. The branched ethylenic macromonomer of claim 1, wherein said branch is a short-chain branch whose main chain has 1 to 5 carbon atoms or a long-chain branch whose main chain has 6 or more carbon atoms.

4. The branched ethylenic macromonomer of claim 1, wherein said branch comprises chain having a chain length of 4 or more carbon atoms.

5. The branched ethylenic macromonomer of claim 1, wherein said branch comprises chain having a chain length of 6 or more carbon atoms.

6. The branched ethylenic macromonomer of claim 1, wherein said ratio of vinyl groups to the total unsaturated groups in the macromonomer is 75 mol % or more.

7. The branched ethylenic macromonomer of claim 1, wherein said ratio of vinyl groups to the total unsaturated groups in the macromonomer is 80 mol % or more.

8. The branched ethylenic macromonomer of claim 1, wherein said weight-average molecular weight of the macromonomer is in the range of 150 to 18,000.

9. The branched ethylenic macromonomer of claim 1, wherein said weight-average molecular weight of the macromonomer is in the range of 180 to 16,000.

* * * * *